(12) United States Patent
Iba

(10) Patent No.: US 8,660,699 B2
(45) Date of Patent: Feb. 25, 2014

(54) BEHAVIOR CONTROL SYSTEM AND ROBOT

(75) Inventor: Soshi Iba, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 427 days.

(21) Appl. No.: 12/971,613

(22) Filed: Dec. 17, 2010

(65) Prior Publication Data

US 2011/0160908 A1 Jun. 30, 2011

(30) Foreign Application Priority Data

Dec. 24, 2009 (JP) ................................ 2009-292775
Dec. 24, 2009 (JP) ................................ 2009-292776
Dec. 7, 2010 (JP) ................................ 2010-272413

(51) Int. Cl.
*G05B 15/00* (2006.01)

(52) U.S. Cl.
USPC ............................... 700/262; 700/260; 901/1

(58) Field of Classification Search
USPC ......... 700/249, 250, 523, 258, 260, 261, 262; 901/1, 50
See application file for complete search history.

(56) References Cited

U.S. PATENT DOCUMENTS

| | | | | |
|---|---|---|---|---|
| 5,554,033 | A * | 9/1996 | Bizzi et al. | 434/247 |
| 8,078,321 | B2 * | 12/2011 | Iba | 700/253 |
| 8,315,740 | B2 * | 11/2012 | Hasegawa et al. | 700/260 |
| 2009/0066490 | A1 | 3/2009 | Mitzutani et al. | 340/435 |
| 2009/0326679 | A1 * | 12/2009 | Iba | 700/29 |
| 2009/0326710 | A1 * | 12/2009 | Iba | 700/246 |
| 2011/0231016 | A1 * | 9/2011 | Goulding | 700/246 |
| 2011/0243377 | A1 * | 10/2011 | Casamona et al. | 382/103 |

FOREIGN PATENT DOCUMENTS

| | | |
|---|---|---|
| JP | 2003-094363 | 4/2003 |
| JP | 2005-088175 | 4/2005 |
| JP | 2007-125645 | 5/2007 |
| JP | 2007-233798 | 9/2007 |
| JP | 2009-066692 | 4/2009 |

OTHER PUBLICATIONS

Motion Emergency of Humanoid Robots by Attractor Design of a Nonlinear Dynamics, Masafumi Okada et al., Journals of Society of Instrument and Control Engineers, vol. 41, No. 6,533/540 (2005).
Yano, et al., "Tracking Ball Using Particle Filter for Automatic Video Generation", 2007, The Institution of Electronics, and Information and Communication Engineers, General Meeting, Proceeding 2007-10053-156. 2 pages.
Takahashi, et al., Golf Ball Tracking in Tee-shot Scenes Using Particle Filter, FIT2007 (The Sixth Forum on Information Technology), Proceeding 2009-10002-063, 3 pages.

* cited by examiner

*Primary Examiner* — Jason Holloway
(74) *Attorney, Agent, or Firm* — Rankin, Hill & Clark LLP

(57) ABSTRACT

A behavior control system capable of controlling the behavior of an agent (robot) such that the agent securely applies a force to a moving object. The behavior control system calculates the degree of overlapping of a time-series probability density distribution between a predicted position trajectory of an object (ball) and a position trajectory candidate of a counter object (racket). Further, a behavior plan of the agent (robot) is generated such that the counter object is moved according to a desired position trajectory, which is a mean position trajectory or a central position trajectory of a position trajectory candidate of the counter object which has the highest degree of overlapping with the predicted position trajectory of the object among a plurality of position trajectory candidates of the counter object.

14 Claims, 16 Drawing Sheets

PREDICTED POSITION
TRAJECTORY OF OBJECT P (X₁ (t))

• :PREDICTED POSITION
   OF OBJECT

◯ :SPREAD OF PROBABILITY
   DENSITY DISTRIBUTION

PREDICTED POSITION
TRAJECTORY OF OBJECT P (X₁ (t))

⊙ :INTERACTION POINT CANDIDATE

FIG.5 (a)

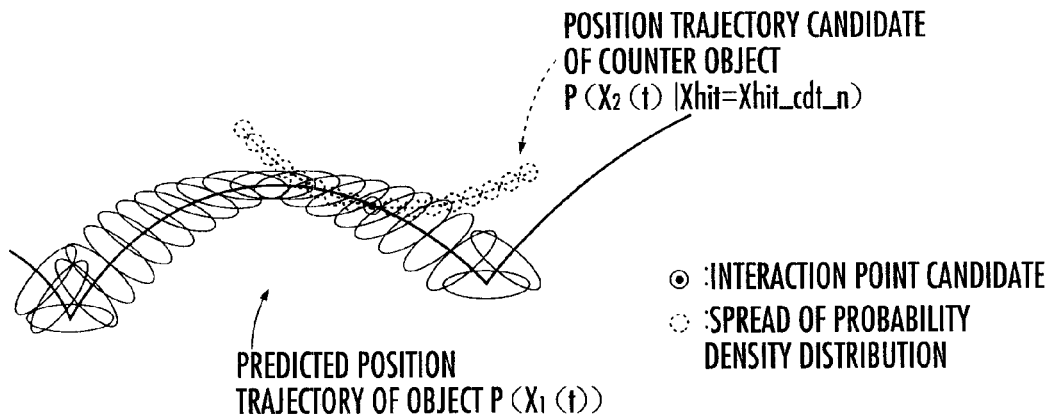

POSITION TRAJECTORY CANDIDATE OF COUNTER OBJECT
$P(X_2(t) | Xhit=Xhit\_cdt\_n)$

⊙ :INTERACTION POINT CANDIDATE
○ :SPREAD OF PROBABILITY DENSITY DISTRIBUTION

PREDICTED POSITION TRAJECTORY OF OBJECT $P(X_1(t))$

FIG.5 (b)

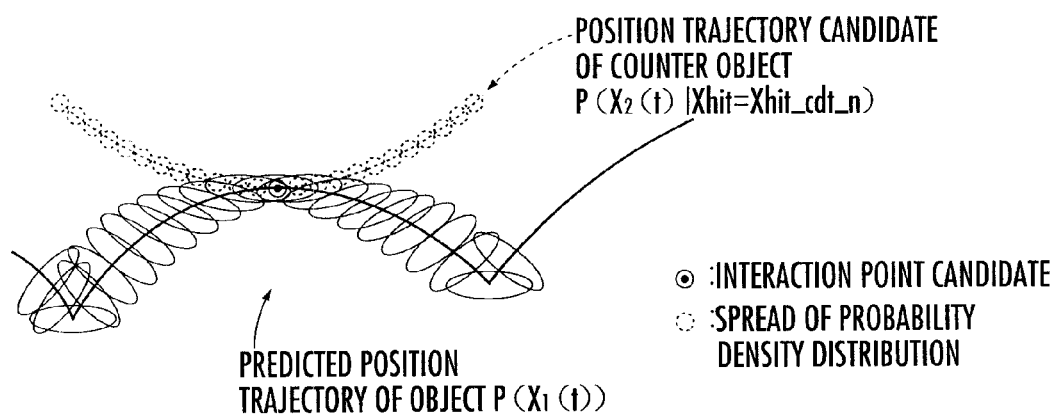

POSITION TRAJECTORY CANDIDATE OF COUNTER OBJECT
$P(X_2(t) | Xhit=Xhit\_cdt\_n)$

⊙ :INTERACTION POINT CANDIDATE
○ :SPREAD OF PROBABILITY DENSITY DISTRIBUTION

PREDICTED POSITION TRAJECTORY OF OBJECT $P(X_1(t))$

FIG.5 (c)

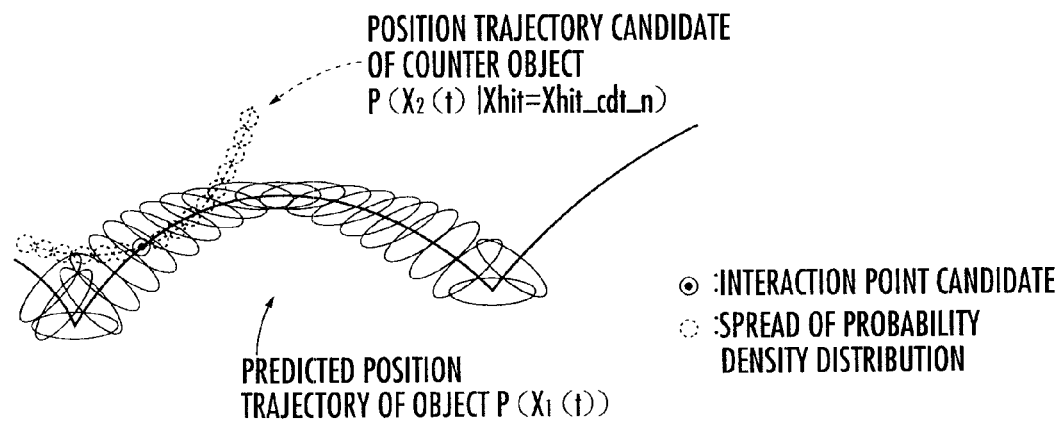

POSITION TRAJECTORY CANDIDATE OF COUNTER OBJECT
$P(X_2(t) | Xhit=Xhit\_cdt\_n)$

⊙ :INTERACTION POINT CANDIDATE
○ :SPREAD OF PROBABILITY DENSITY DISTRIBUTION

PREDICTED POSITION TRAJECTORY OF OBJECT $P(X_1(t))$

BEHAVIOR CONTROL SYSTEM AND ROBOT

BACKGROUND OF THE INVENTION

1. Field of the Invention

The present invention relates mainly to a system for controlling the behavior pattern of an agent.

2. Description of the Related Art

A polynomial, Bezier or attractor or the like has been used as a technique to generate a trajectory of a state variable of an agent appropriate for an actual situation on the basis of a reference state variable trajectory.

For example, it has been reported that a stable autonomous motion of a humanoid robot acting as an agent is achieved by designing an attractor in the state space of a dynamical system and by the trajectory of the robot being entrained into the attractor, as disclosed in "Motion Emergence of Humanoid robots by an Attractor Design of Nonlinear Dynamics" by Masashi Okada, Kenta Osato, and Yoshihiko Nakamura in Journal of the Society of Instrument and Control Engineers, vol. 41, No. 6, pp533-540 (2005).

Further, a technique has been proposed in which a plurality of probability models representing different motion primitives, including "raise" and "bring close," corresponding to motion sequences of a robot are combined, and the maximum likelihood trajectory of a trajector, such as "PEN," in the combined probability model is searched for, as disclosed in Japanese Patent Application Laid-Open No. 2009-066692.

However, if a purpose is to prevent an agent from applying a force to a moving object (trajector) or from coming in contact with the object, then it is difficult to attain the intended behavior, because the position of an interaction point is indeterminate.

SUMMARY OF THE INVENTION

It is an object of the present invention, therefore, to provide a system and the like capable of controlling the behavior of an agent such that the agent will behave according to a desired interaction pattern relative to a moving object.

To this end, a behavior control system which controls the behavior of an agent according to a behavior plan, comprising:

a first arithmetic processing element configured to determine a predicted position trajectory of an object expressed by a probability density distribution of time-series predicted positions of the object in the future on the basis of time-series measured positions or estimated positions of the object;

a second arithmetic processing element configured to generate a position trajectory candidate of a counter object expressed by a probability density distribution which indicates likelihoods corresponding to time-series positions of a counter object which includes a position coinciding, in a spatial and time-series manner, with an interaction point candidate included in the predicted position trajectory of the object in a range reachable by the counter object by a motion of the agent; and a third arithmetic processing element configured to generate a behavior plan such that a position trajectory of the counter object coincides with a desired position trajectory of the counter object, which is a mean position trajectory or a central position trajectory of one position trajectory candidate selected from among a plurality of position trajectory candidates of the counter object on the basis of the degree of overlapping of a time-series probability density distribution with the predicted position trajectory of the object (a first aspect of the invention).

The behavior control system in accordance with the present invention determines the predicted position trajectory of an object expressed by means the existence probability density distribution (or likelihood) of the time-series predicted positions of the object in the future on the basis of the time-series measured positions or estimated positions of the object. The spatial spread of the probability density distribution is defined by a standard deviation or variance (covariance matrix).

Further, the behavior control system generates a position trajectory candidate of a counter object expressed by a probability density distribution indicating likelihoods corresponding to time-series positions of the counter object, which include a position coinciding, in a spatial and time-series manner, with an interaction point candidate included in a predicted position trajectory of the object in a range reachable by the counter object by a motion of the agent.

Here, the term "likelihood" includes the concepts of the propriety of an instructor to be emulated by an agent, the degree of appropriateness of the way a counter object is moved to effect an interaction with an object at a certain position, and the degree of match of the motion of the object with the counter object after the interaction.

The term "counter object" is a concept that includes even a part of the body of an agent in addition to an object, such as a tool or an appliance, which is separate and independent from the agent and which is moved as the agent moves. The counter object includes an object constantly in contact with the agent, an object that temporarily comes in contact with the agent, and an object constantly away from the agent (e.g., a vehicle that is remotely controlled). One position trajectory candidate may be generated for one interaction point candidate or a plurality of different position trajectory candidates may be generated for one interaction point candidate.

Further, the behavior plan of the agent is generated such that the counter object is moved along a desired position trajectory, which is a position trajectory candidate selected from among the plurality of position trajectory candidates of the counter object on the basis of the degree of overlapping of the time-series probability density distribution with the predicted position trajectory of the object.

The degree of overlapping of the time-series probability density distributions between trajectories indicates the probability degree of interaction between the counter object and the object. Thus, controlling the behavior of the agent according to the behavior plan generated as described above makes it possible to enable the agent to securely carry out a task, which is to move the counter object such that the interaction pattern relative to the object agrees with a desired pattern. Moreover, the position of the counter object is allowed to vary or fluctuate on the basis of the spread of the probability density distribution, so that the agent is also allowed to have a motion pattern variation in a range within which the aim to carry out a task is fulfilled.

In the behavior control system in accordance with the first aspect of the invention, the third arithmetic processing element may be configured to select, from among the plurality of position trajectory candidates of the counter object, the position trajectory candidate whose degree of overlapping of the time-series probability density distribution with the predicted position trajectory of the object becomes the highest or the lowest (a second aspect of the invention).

According to the behavior control system having the aforesaid construction, controlling the behavior of the agent on the basis of the behavior plan generated as described above makes it possible to enable the agent to securely carry out a task for moving the counter object while effecting interaction with the object or avoiding interaction or contact with the object.

In the behavior control system according to the first aspect of the invention, the second arithmetic processing element may be configured to further determine a post-interaction predicted position trajectory of the object expressed by the probability density distribution of the time-series predicted position of the object in the case where it is assumed that the counter object interacts with the object at the aforesaid interaction point candidate on the basis of the predicted position trajectory of the object and each of the plurality of position trajectory candidates of the counter object, and the third arithmetic processing element may be configured to select the one position trajectory candidate from among the plurality of position trajectory candidates of the counter object on the basis of the degree of overlapping of the time-series probability density distribution between the post-interaction predicted position trajectory of the object and a specified position trajectory in addition to the degree of overlapping of the time-series probability density distribution with the predicted position trajectory of the object (a third aspect of the invention).

The behavior control system having the aforesaid construction determines the post-interaction predicted position trajectory of the object expressed by the probability density distributions of the time-series predicted positions of the object in the case where it is assumed that the counter object interacts with the object at the interaction point candidate on the basis of the predicted position trajectory of the object and each of the plurality of position trajectory candidates of the counter object.

Further, a position trajectory candidate is selected from among the plurality of position trajectory candidates of the counter object according to the total degree of overlapping of the degree of overlapping of the time-series probability density distribution with the predicted position trajectory of the object and the degree of overlapping of the time-series probability density distribution between the post-interaction predicted position trajectory of the object and the specified position trajectory. Then, the behavior plan of the agent is generated such that the counter object is moved along the desired position trajectory, which is the selected position trajectory. The specified position trajectory is also expressed by a probability density distribution indicating the likelihoods associated with time-series specified positions.

The degree of overlapping of the time-series probability density distribution with the predicted position trajectory of the object indicates the probability degree of interaction between the counter object and the object, as described above. The degree of overlapping of the time-series probability density distribution between a post-interaction predicted position trajectory of the object and a specified position trajectory indicates the degree of the probability of the object being displaced along the specified position trajectory after interacting with the counter object. Hence, the degree of the total overlapping degree based on the two overlapping degrees indicates the degree of the probability of the interaction between the counter object and the object and also of the probability of the object being displaced according to the specified position trajectory after the interaction with the counter object.

With this arrangement, controlling the behavior of the agent according to the behavior plan generated as described above makes it possible to move the counter object such that the interactive pattern relative to the object agrees with a desired pattern, thus enabling the agent to securely perform a task for causing the object to be displaced according to a position trajectory which has a desired relationship with the specified position trajectory. Further, the position of the counter object is allowed to vary or fluctuate on the basis of the spread of the probability density distribution, so that the agent is also allowed to have a motion pattern variation within a range in which the aim to carry out the task is fulfilled.

In the behavior control system according to the third aspect of the invention, the third arithmetic processing element may be configured to select, from among the plurality of position trajectory candidates of the counter object, the one position trajectory candidate whose total degree of overlapping of the degree of overlapping of the time-series probability density distribution with the predicted position trajectory of the object and the degree of overlapping of the time-series probability density distribution between the post-interaction predicted position trajectory of the object and the specified position trajectory is the highest or the lowest (a fourth aspect of the invention).

According to the behavior control system having the aforesaid construction, controlling the behavior of the agent on the basis of the behavior plan generated as described above makes it possible to enable the agent to securely carry out a task for moving the counter object to cause interaction with the object or moving the counter object while avoiding interaction or contact with the object, thus causing the object to be displaced along the same position trajectory as the specified position trajectory or a position trajectory that does not overlap the specified position trajectory.

In the behavior control system according to the first aspect of the invention, the second arithmetic processing element may be configured to generate the position trajectory candidate of the counter object such that the spread of the probability density distribution indicating the likelihood associated with the position of the counter object which agrees with the interaction point candidate in the spatial and time series manner is smaller than the spread of the probability density distribution indicating the likelihood associated with another position (a fifth aspect of the invention).

According to the behavior control system having the aforesaid construction, the position of the counter object at each time point is allowed to vary on the basis of the spatial spread of the probability density distribution of a desired position trajectory of the counter object, as described above. To be more specific, at the time point when it is highly necessary to prohibit or restrict the agent from changing its behavior pattern in order to cause the agent to carry out a task, the change of the behavior pattern is prohibited or restricted, thereby enabling the agent to securely perform the task. For example, at the time of interaction or immediately before or after the interaction, it is highly required to prohibit or restrict the change of the behavior pattern in order to ensure that the agent carries out the task. Meanwhile, at the time point when the need for such prohibition or restriction is low for the agent to carry out the task, the agent is allowed to change its behavior pattern over a relatively wide range, thus enabling the agent to avoid being forced to perform a structurally strained or inefficient behavior.

In the behavior control system according to the first aspect of the invention, the third arithmetic processing element may be configured to calculate the aforesaid degree of overlapping, excluding a time point that coincides with the interaction point candidate in the time series manner (a sixth aspect of the invention).

In the behavior control system according to any one of the first to the fifth aspects of the invention, the third arithmetic processing element may be configured to add a spread based on a standard deviation or variance of the probability density distribution of the position trajectory candidate of the counter object to each of probability density distribution groups of the position trajectory candidate, or to correct the spread of each of the probability density distribution groups of the position trajectory candidate to a spread based on the standard deviation or variance, and then to calculate the degree of overlapping (a seventh aspect of the invention).

According to the behavior control system having the construction described above, the time point corresponding to an interaction point candidate will be a singular point, thus making it possible to avoid impairing the reliability of the calculation result of the overlapping degree. Hence, the behavior of the agent is controlled such that the counter object is moved along a desired position trajectory, which is a position trajectory candidate exhibiting a maximum overlapping degree, thereby enabling the agent to securely carry out the task for moving the counter object to effect the interaction with the object.

In the behavior control system according to the first aspect of the invention, the second arithmetic processing element may be configured to generate a position trajectory candidate of the counter object according to a stochastic transition model in which the position of the counter object and a first order to an n-th order temporal differential value (n=1, 2, . . . ) thereof continuously change according to a factor which indicates the shape property of an exemplary position trajectory of the position of the counter object (an eighth aspect of the invention).

According to the behavior control system having the aforesaid construction, the stochastic transition model, which is the basis on which the position trajectory candidate of the counter object is generated, follows the factor indicating the shape property of the exemplary position trajectory of the counter object, such as the characteristic of the behavior of an instructor observed when the instructor moves the counter object to effect interaction with the object. Further, the stochastic transition model represents the behavior of the agent in which the position of the counter object and the first order to the n-th order temporal differential value (n=1, 2, . . . ) thereof continuously change.

This arrangement allows the position trajectory candidate of the counter object, which is generated according to the stochastic transition model, to have the shape property of the exemplary position trajectory of a state variable and spatial and temporal continuity. Thus, controlling the behavior of the agent according to one of position trajectory candidates permits an interaction between the counter object and the object by a smooth motion while causing the agent to emulate or reproduce an exemplary behavior property.

In the behavior control system according to the eighth aspect of the invention, the second arithmetic processing element may be configured to generate an estimated position trajectory in the forward direction represented by the probability density distribution of an estimated position of the counter object in the forward direction time-series-wise according to the stochastic transition model, to generate an estimated position trajectory in the reverse direction represented by the probability density distribution of an estimated position of the counter object in the reverse direction time-series-wise, and then to combine, in the time series manner, the probability density distributions of the estimated position trajectory in the forward direction and the estimated position trajectory in the reverse direction, thereby generating a position trajectory candidate of the counter object expressed by the time-series combination result of the probability density distributions (a ninth aspect of the invention).

According to the behavior control system having the construction described above, the forward estimated position trajectory is generated, which is represented by the existence probability density distribution of the position of the counter object sequentially estimated in the forward time-series direction or toward the future on the basis of the stochastic transition model. Meanwhile, the reverse estimated position trajectory is generated. which is represented by the existence probability density distribution of the position of the counter object sequentially estimated in the reverse time-series direction or toward the past on the basis of the stochastic transition model.

Subsequently, the probability density distributions of the forward estimated position trajectory and the reverse estimated position trajectory are combined in the time series manner so as to generate the position trajectory candidate of the counter object represented by the combined probability density distribution. This allows the position trajectory candidate of the counter object to have spatial and temporal continuity before and after the candidate of the point of the interaction between the object and the counter object.

In the behavior control system according to the eighth aspect of the behavior control system, the second arithmetic processing element may be configured to adopt a first factor defined for effecting the interaction between the counter object and the object as the aforesaid factor before the interaction point candidate time-series-wise, and to generate a position trajectory candidate of the counter object according to the stochastic transition model in which a second factor, which is different from the first factor, is adopted as the aforesaid factor after the interaction point candidate time-series-wise (a tenth aspect of the invention).

According to the behavior control system having the construction described above, behavior plans having different natures can be generated before or after the task for moving the counter object to effect an interaction with the object is carried out. To be more specific, after having the agent carry out the task, the agent is allowed to behave in a pattern free from restrictions placed before carrying out the task.

The robot in accordance with the present invention to fulfill the aforesaid objective is a robot serving as an agent which has an actuator and a behavior control system and which is constructed such that the behavior thereof is controlled by controlling the operation of the actuator by the behavior control system, wherein the behavior control system includes a first arithmetic processing element constructed to determine a predicted position trajectory of an object expressed by a probability density distribution of a time-series predicted position of the object in the future on the basis of a time-series measured position or an estimated position of the object; a second arithmetic processing element configured to generate a position trajectory candidate of a counter object expressed by a probability density distribution indicating a likelihood corresponding to a time-series position of the counter object which includes a position coinciding, in a spatial and time-series manner, with an interaction point candidate included in a predicted position trajectory of the object in a range reachable by the counter object by a motion of the agent; and a third arithmetic processing element configured to generate the behavior plan such that the position trajectory of the counter object coincides with a desired position trajectory of the counter object, which is a mean position trajectory or a central position trajectory of one position trajectory candidate selected from among a plurality of position trajectory candidates of the counter object on the basis of the degree of overlapping of a time-series probability density distribution with the predicted position trajectory of the object (an eleventh aspect of the invention).

The robot in accordance with the present invention enables a robot serving as an agent to securely carry out a task for moving a counter object such that an interaction pattern for an object coincides with a desired pattern.

BRIEF DESCRIPTION OF THE DRAWINGS

FIG. 5(a) to FIG. 5(c) are graphical illustrations related to position trajectory candidates of a counter object;

DESCRIPTION OF THE PREFERRED EMBODIMENTS (Configuration of the Behavior Control System)

Figure 1:
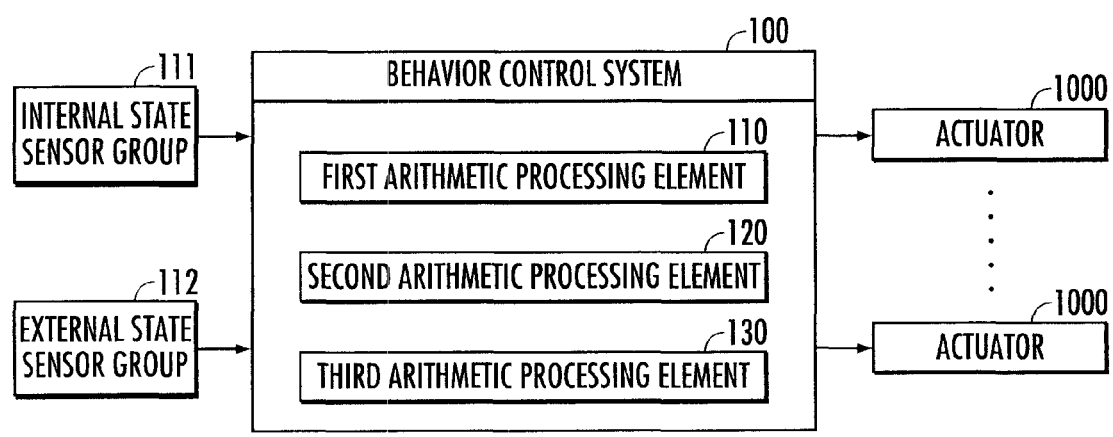
FIG. 1 is a block diagram illustrating the configuration of a behavior control system in accordance with the present invention.
Figure 2:
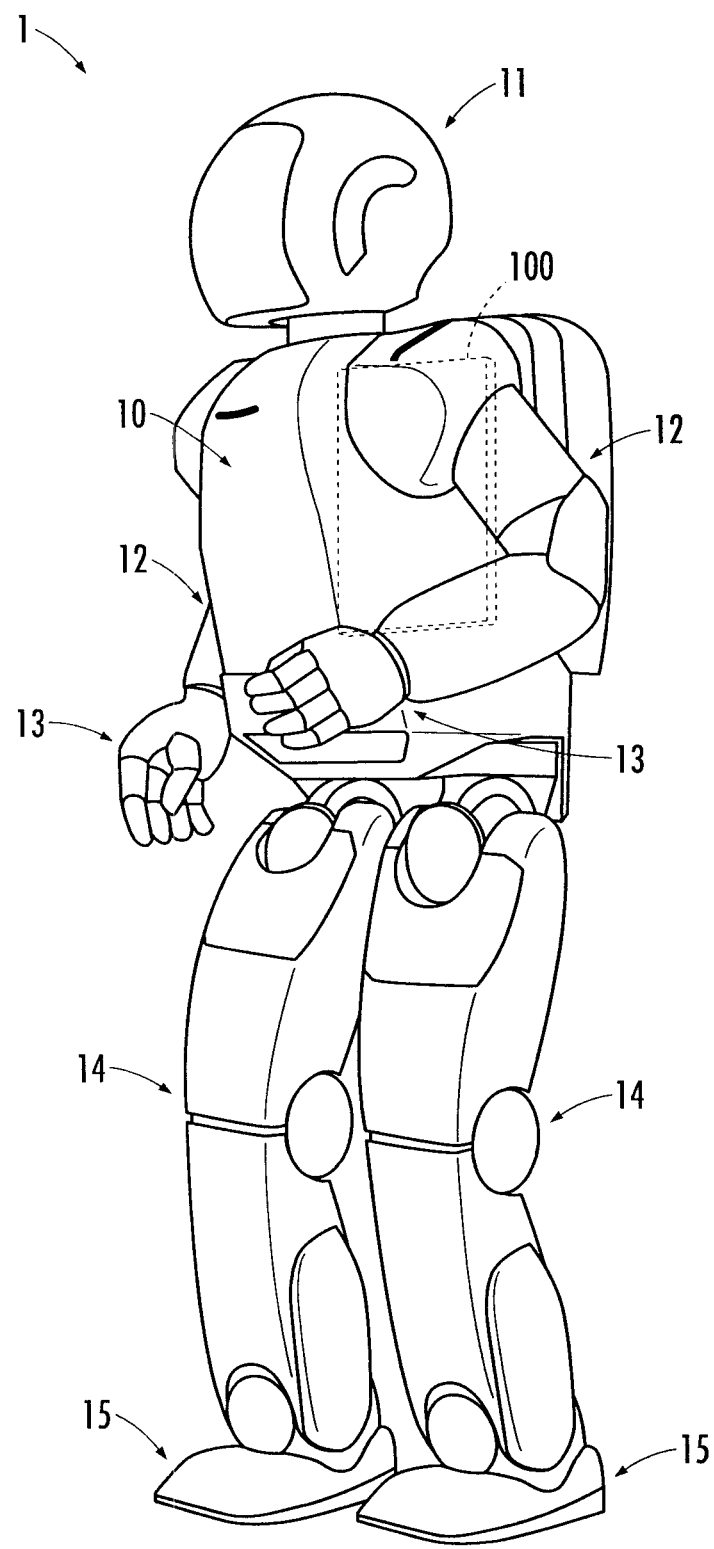
FIG. 2 is a graphical illustration of the construction of a robot serving as an agent.

A behavior control system 100 (an embodiment of the present invention) illustrated in FIG. 1 controls the behavior of a robot 1 by controlling the operation of an actuator 10 installed in the robot 1 acting as an agent illustrated in FIG. 2.

The robot 1 is a legged mobile robot provided with a body 10, a head 11 mounted on the top of the body 10, right and left arms 12 extended from the right and left sides of an upper portion of the body 10, hands 13 provided at the distal ends of the arms 12, right and left legs 14 extended downward from the bottom of the body 10, and feet 15 attached to the distal ends of the legs 14, as with a human being.

As disclosed in Published Japanese Translation of PCT Application 03-090978 or Published Japanese Translation of PCT Application 03-090979, the robot 1 is capable of bending and stretching the arms 12 and the legs 14 at a plurality of joint mechanisms corresponding to a plurality of joints, such as shoulder joints, elbow joints, carpal joints, hip joints, knee joints, and foot joints, of a human being by using forces transmitted from actuators 1000.

Each of the arms 12 has a first arm link connected to the body 10 through the intermediary of a shoulder joint mechanism and a second arm link having one end thereof connected to an end of the first arm link through the intermediary of an elbow joint mechanism and the other end thereof connected to the root of the hand 13 through the intermediary of the carpal joint.

Each of the legs 14 has a first leg link connected to the body 10 through the intermediary of a hip joint mechanism and a second leg link having one end connected to an end of the first leg link through the intermediary of a knee joint mechanism and the other end connected to the foot 15 through the intermediary of the foot joint. The robot 1 is capable of autonomously traveling by repeatedly leaving and landing the right and left legs 14 from and onto a floor.

The behavior control system 100 is constructed of an electronic control unit installed in the robot 1. The electronic control unit includes a CPU, a ROM, a RAM, and an I/O circuit. Alternatively, a part of the behavior control system 100 may be constructed of an external computer of the robot 1 and the rest may be constructed of a computer capable of receiving calculation results from the external computer with or without wires.

The behavior control system 100 is provided with a first arithmetic processing element 110, a second arithmetic processing element 120, and a third arithmetic processing element 130.

The first arithmetic processing element 110 determines the predicted position trajectory of an object on the basis of output signals of an internal state sensor group 111 and an external state sensor group 112, respectively.

The internal state sensor group 111 primarily includes an acceleration sensor and a gyroscope for measuring the time-series position of a representative point (e.g., the center of gravity) of the robot 1 and the time-series posture of a representative portion (e.g., the body 10) thereof, and rotary encoders which measure the bending angles or the like of joint mechanisms.

The external state sensor group 112 includes a stereo camera mounted on the head 11 and other imaging devices or sensors capable of measuring the time-series position of a counter object, such as an active sensor using infrared light or a motion capture system (not shown) installed in the body 10.

The second arithmetic processing element 120 generates, on the basis of the predicted position trajectory of the object, a position trajectory candidate of a counter object that implements an interaction between the counter object and the object.

The third arithmetic processing element 130 generates a behavior plan of the robot 1 such that the counter object will be moved along a desired position trajectory, which is the position trajectory candidate selected from among a plurality of position trajectory candidates of the counter object and which has a highest degree of overlapping of time-series probability density distribution with the predicted position trajectory of the object.

Incidentally, the devices constituting the present invention is physically composed of memories, such as ROMs and RAMs, and arithmetic processors (CPUs) which read programs from the memories and execute arithmetic processing for which they are responsible. The programs may be installed in computers through the intermediary of software recording media, such as CDs and DVDs, or may be downloaded into the computers by a server via a network or an artificial satellite in response to request signals transmitted from the robot 1 to the server.

(Function of the Behavior Control System (A First Embodiment))

Figure 6:
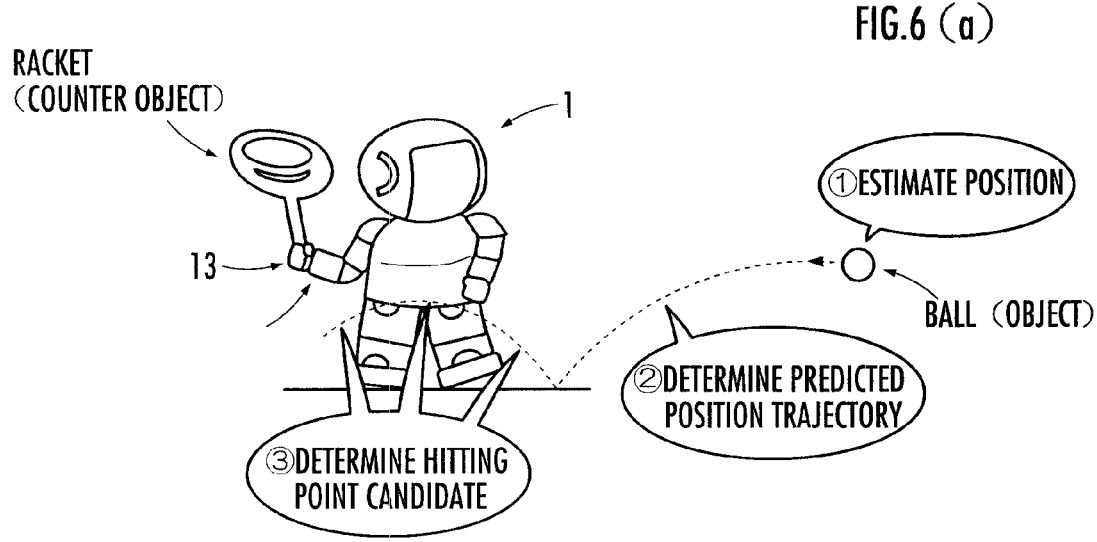
FIG. 6(a) to FIG. 6(c) are graphical illustrations related to behaviors of a robot.
Figure 6:
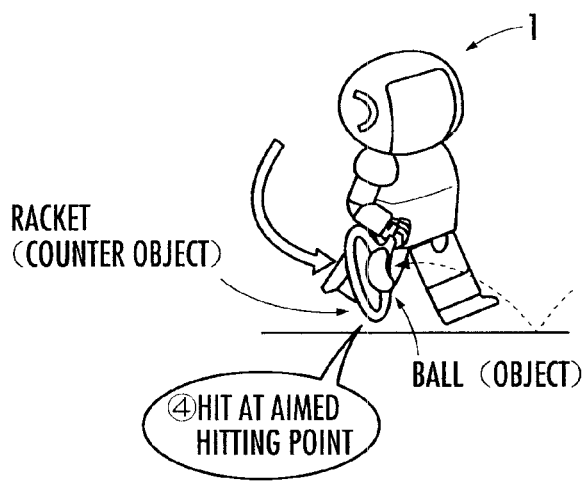
Figure 6:
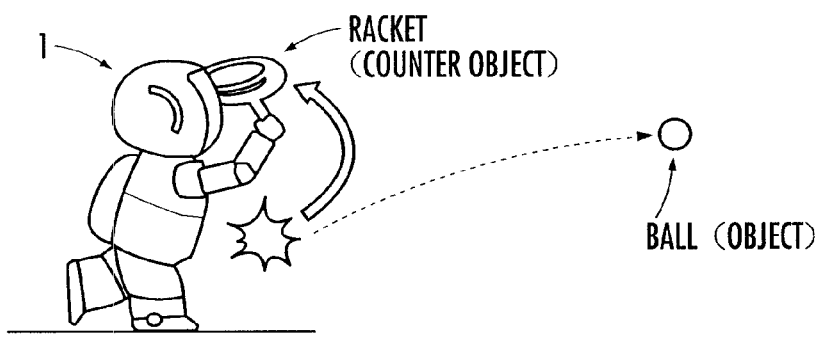

The first embodiment of the arithmetic processing carried out by the behavior control system 100 having the aforesaid construction will be described. As illustrated in FIGS. 6(*a*) to 6(*c*), a description will be given of an example of executing a task in which the robot 1 (agent) moves a racket held in one of the right and left hands 13 to hit a moving ball (an object) back by the racket, more accurately, the head of the racket (a counter object). The positions of the ball and the racket, respectively, may be defined on any coordinate system, such as a world coordinate system or a robot coordinate system, as long as it is a shared coordinate system.

Figure 3:
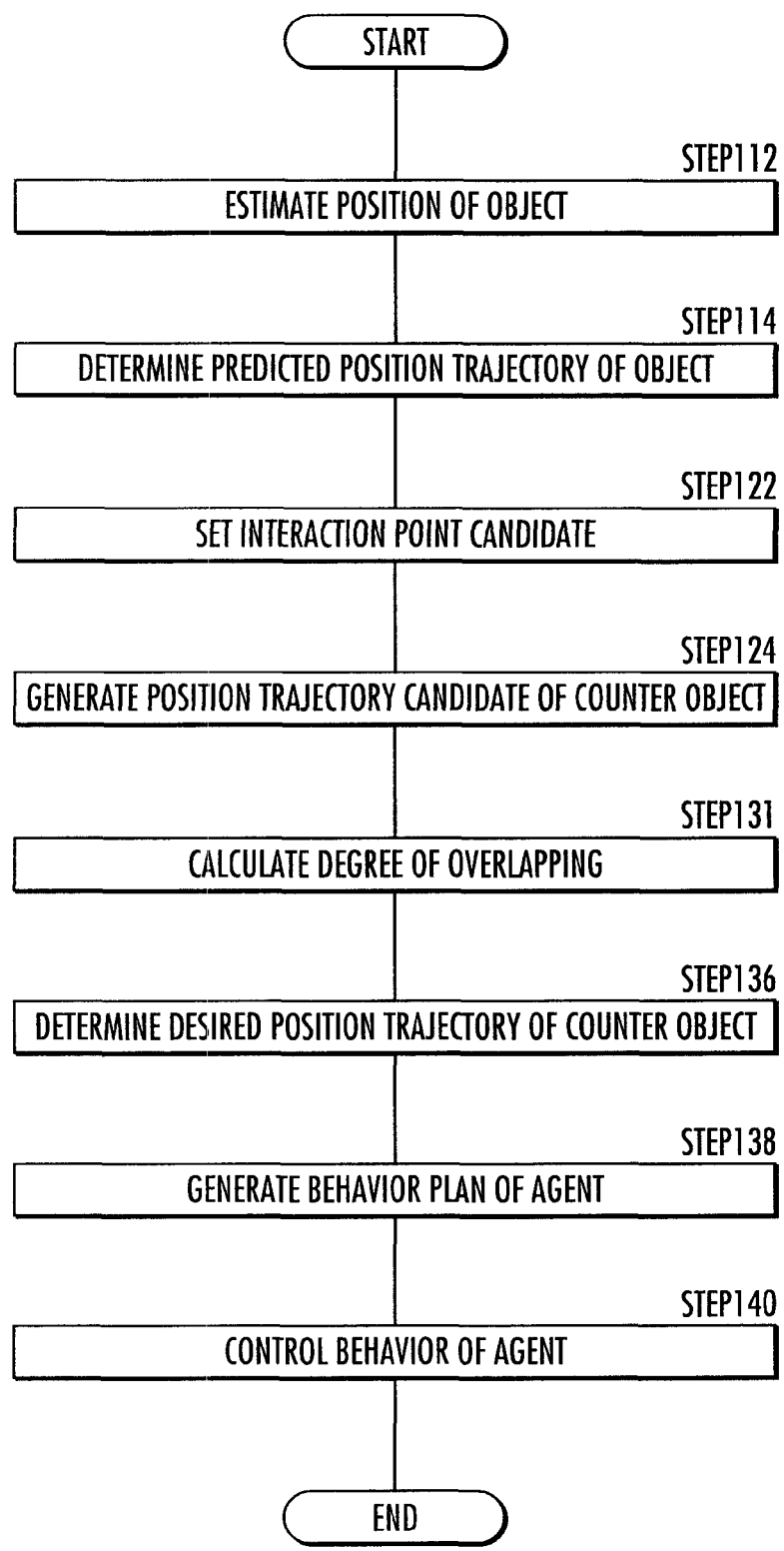
FIG. 3 is a flowchart illustrating a behavior control method for a robot (a first embodiment)

First, the first arithmetic processing element 110 estimates the time-series position of the ball in a world coordinate system or a robot coordinate system on the basis of the time-series position of the ball indicated by output signals of the external state sensor group 112 (STEP112 in FIG. 3). The method for estimating the position of the ball will be described hereinafter.

Subsequently, the first arithmetic processing element 110 determines the predicted position trajectory of the ball on the basis of a time-series estimated ball position $x_1(k)$ (STEP114 in FIG. 3).

Figure 4:
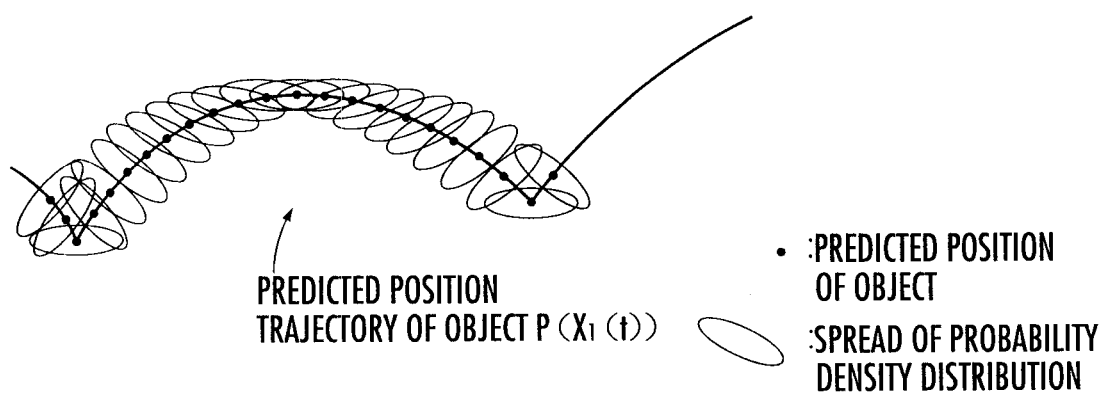
FIG. 4(a) and FIG. 4(b) are graphical illustrations related to predicted position trajectories of an object and interaction points.
Figure 4:
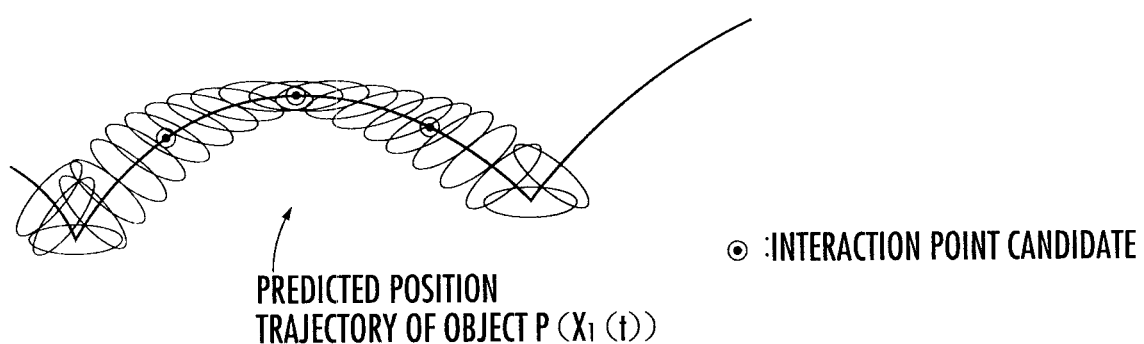

Thus, as illustrated in FIG. 4(*a*), a predicted position trajectory having a spread represented by a probability density distribution $P(x_1(t))$ of a time-series predicted position $x_1(t)$ of the ball in the future (refer to the solid-line rings) is generated. The dots on the solid line shown in FIG. 4(*a*) indicate time-series average predicted positions $\mu x_1(t)$ of the ball. Here, "t" denotes continuous time rather than discrete time. The predicted position trajectory has a spread based on a standard deviation or variance of the existence probability density distribution $P(x_1(t))$ thereof, the mean predicted position $\mu x_1(t)$ of the ball being the reference.

The mean predicted position $\mu x_1(t)$ of the ball is indicated by expression (001).

$$\mu x_1(t) = \Sigma_{n=1 \ldots Np}[P_N(t) x_{1N}(t)] / \Sigma_{n=1 \ldots Np}[P_N(t)] \qquad (001)$$

where "$x_{1N}(t)$" denotes an n-th particle of $x_1(t)$; "$P_N(t)$" denotes the likelihood of the n-th particle; and "Np" denotes the number of particles.

The predicted position $x_1(t)$ of the ball is calculated according to a dynamic equation on the basis of a measured ball position $x_1(k)$ at current time k, a velocity $v_1(k) = \{x_1(k) - x_1(k-1)\}/\Delta t$ and an acceleration a $\alpha_1(k) = \{v_1(k) - v_1(k-1)\}/\Delta t$ ($\Delta t$: calculation cycle). The existence probability density distribution $P(x_1(t))$ of the predicted position $x_1(t)$ of the ball is defined to have a covariance matrix $Q(t) = [Q\_ij]$ denoted by expression (002).

$$Q\_ij(t) = \Sigma_{n=1 \ldots Np}[P_N(t)(x_{1ni}(t) - \mu x_{1i}(t))(x_{1nj}(t) - \mu x_{1j}(t))]/(1 - \Sigma_{n=1 \ldots Np}[P_N(t)2]) \qquad (002)$$

where "$x_{1ni}(t)$" means the state amount of an i-th component (x=1, y=2, z=3) of an n-th particle of $x_1(t)$, and "$\mu x_{1i}(t)$" means an i-th state amount of a weighted average $\mu x_1(t)$.

Further, the second arithmetic processing element 120 generates a plurality of interaction point candidates xhit_cdt_m (m=1, 2, ..., M) in a range reachable by the racket by a motion of the robot 1 (STEP122 of FIG. 3).

Thus, as illustrated in FIG. 4(*b*), each of a plurality of points included in the predicted position trajectory of the ball is set as the interaction point candidate xhit_cdt_m. Incidentally, the interaction point candidate xhit_cdt_m may agree or disagree with the mean predicted position $\mu x_1(t)$ of the ball (a mean point derived from the existence probability density distribution $P(x_1(t))$ of the predicted position of the ball). The range reachable by the racket is estimated by a kinematics calculation method on the basis of the bending angles of the joint mechanisms indicated by output signals of the internal state sensor group 111 and kinematics parameters, such as the position and posture of the racket relative to the hand 13. When estimating the racket-reachable range, it is checked that different portions of the robot 1, such as the body 10 and the arms 12, do not interfere or contact with each other.

The position of the racket in a hand coordinate system whose position and posture are fixed relative to the palm of the hand 13 may be set beforehand, or may be sequentially calculated on the basis of the gripping position and posture of the racket relative to the hand 13 captured by an imaging device of the internal state sensor group 111.

Further, the second arithmetic processing element 120 generates a position trajectory candidate of the racket (the counter object) passing the interaction point candidate xhit_cdt_m (STEP124 in FIG. 3).

Thus, as illustrated in each of FIGS. 5(*a*) to 5(*c*), the position trajectory candidate of the racket is generated, which is denoted by a probability density distribution $P(x_2(t)|xhit\_cdt\_m)$ (refer to the dotted-line rings) representing the likelihood associated with a time-series positions $x_2(t)$ of the racket (refer to the dotted lines), which includes the interaction point candidate xhit_cdt_m as one position. The position trajectory candidate of the racket has a spread based on a standard deviation or variance of the existence probability density distribution $P(x_2(t)|xhit\_cdt\_m)$ thereof, the mean position or the central position $\mu x_2(t)$ of the racket being the reference.

Further, the third arithmetic processing element 130 calculates the degree of overlapping Ci between the predicted position trajectory of the ball and each of the plurality of position trajectory candidates of the racket (STEP131 of FIG. 3). More specifically, the temporal integration value (refer to expression (003)) of the product of the probability density distribution $P(x_1(t))$ representing the predicted position trajectory of the ball and the probability density distribution $P(x_2(t)|xhit=xhit\_cdt\_m)$ representing each position trajectory candidate of the racket is calculated as the degree of overlapping Ci.

$$Ci = Intdt \cdot P(x_1(t))P(x_2(t)|xhit=xhit\_cdt\_m) \qquad (003)$$

"Intdt" denotes the temporal integration (the same will apply hereinafter). When calculating the degree of overlapping Ci, for example, one of the following strategies 1 to 3 is adopted. This is to avoid a situation wherein an interaction point candidate becomes a singular point, impairing the reliability of a calculation result of the degree of overlapping.

(Strategy 1)

The degree of overlapping is calculated by excluding the time point coinciding with the interaction point candidate xhit_cdt_m in the time-series manner. More specifically, the degree of overlapping is calculated according to expression (004).

$$Ci = Intdt \cdot P(x_2(t)|xhit\_cdt\_m)P(x_1(t)) \text{ (provided } t = h\_cdt\_m \text{ is excluded)} \qquad (004)$$

(Strategy 2)

The spread based on the standard deviation or variance of the probability density distribution $P(x_2(t)|xhit=xhit\_cdt\_m)$ of the position trajectory candidate of the counter object is added to each of the probability density distribution group of the position trajectory candidate so as to calculate the degree of overlapping Ci.

(Strategy 3)

The spread of the probability density distribution group of the position trajectory candidate of the counter object is corrected to the spread based on the standard deviation or variance, and then the degree of overlapping is calculated.

The third arithmetic processing element 130 determines, as the desired position trajectory of the racket, the mean position trajectory or the central position trajectory of a position trajectory candidate having the highest degree of overlapping Ci among the plurality of position trajectory candidates of the racket (STEP136 of FIG. 3). Subsequently, the third arithmetic processing element 130 generates a behavior plan of the robot 1 which causes the position trajectory of the racket to agree with the desired position trajectory (STEP138 of FIG. 3). More specifically, the time-series desired values of the angles of the joint mechanisms and the position of the center of gravity of the robot 1, the posture of the body 10 and the like are calculated according to an inverse kinematics calculation method on the basis of the desired position $P_2(t)$ of the racket at each time point.

Then, the behavior control system 100 controls the behavior of the robot 1 according to the behavior plan (STEP140 of FIG. 3).

To be more specific, the time-series position and the like of the racket are estimated according to the kinematics calculation method on the basis of the position of the racket in the hand coordinate system and the kinematics parameters, such as the bending angles of the joint mechanisms indicated by output signals of the internal state sensor group 111. Then, the operations of the actuators 1000 are controlled according to a feedback control law such that the estimated values of the angles of the joint mechanisms and the position of the center of gravity of the robot 1 and the posture of the body 10 and the like at each time point agree with the desired values.

Thus, as illustrated in sequence in FIGS. 6(a) to 6(c), the robot 1 performs the task of hitting back the ball, which is bouncing and approaching, forward forehand by using the racket held by one of the hands 13.

Before and after the robot 1 starts to move the racket, the series of processing after estimating the position of the aforesaid object, namely, the ball, is repeatedly carried out for each control cycle until the task is performed (refer to STEPS 112 to 140 of FIG. 3).

(Function of the behavior Control System (A Second Embodiment))

A second embodiment of the arithmetic processing carried out by a behavior control system 100 having the construction described above will now be described. The second embodiment will use the same task example as that of the first embodiment. More specifically, the robot 1 performs the task of hitting a ball back with a racket held by one of the hands 13 of the robot 1. The second embodiment differs from the first embodiment in that the behavior of the robot 1 is controlled such that the ball that has been hit back traces a specified position trajectory.

The arithmetic processing of STEPs 212, 214, 222, 224, 231, 238, and 240 is almost the same as the arithmetic processing of STEPs 112, 114, 122, 124, 131, 138, and 140, respectively, of the first embodiment, so that the arithmetic processing in the second embodiment will be only briefly described.

Figure 7:
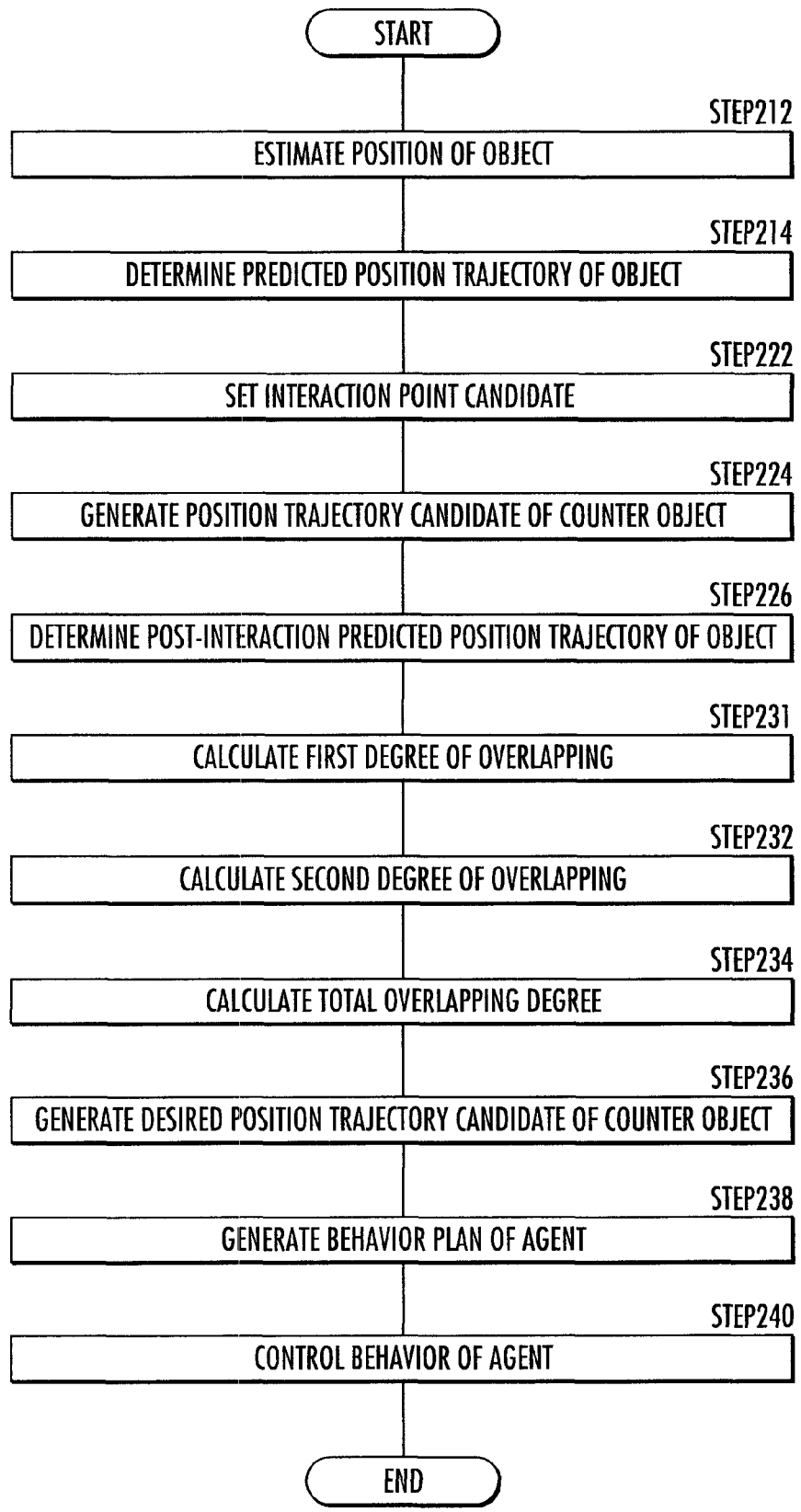
FIG. 7 is a flowchart illustrating a behavior control method for a robot (a second embodiment)

First, a first arithmetic processing element 110 estimates the time-series positions of the ball (STEP212 of FIG. 7), and the predicted position trajectory of the ball (refer to FIG. 4(a)) is determined on the basis of a time-series estimated positions $x_1(k)$ of the ball (STEP214 of FIG. 7).

Further, a second arithmetic processing element 120 generates a plurality of interaction point candidates xhit_cdt_m (m=1, 2, ..., M) (refer to FIG. 4(b)) in the range reachable by the racket by a motion of the robot 1 (STEP222 of FIG. 7).

Subsequently, the second arithmetic processing element 120 generates the position trajectory candidate (refer to FIGS. 5(a) to 5(c)) of the racket (counter object) that passes the interaction point candidate xhit_cdt_m(STEP224 of FIG. 7). Further, the second arithmetic processing element 120 determines a post-interaction predicted position trajectory represented by the probability density distribution of time-series predicted positions x1'(t) of the ball after the interaction point candidate xhit_cdt_m (STEP226 of FIG. 7). The post-interaction predicted position trajectory of the ball is determined under an assumption that the ball has been displaced along the predicted position trajectory and the racket has been displaced according to each of a plurality of position trajectory candidates.

The relative velocity $v_1(h\_cdt\_m)-v_2(h\_cdt\_m)=[\{xhit\_cdt\_m-x_1(h\_cdt\_m-1)\}-(xhit\_cdt\_m-x_2(h\_cdt\_m-1))]/\Delta t=\{x_2(h\_cdt\_m-1)\}-x_1(h\_cdt\_m-1)\}/\Delta t$ of the ball with respect to the racket at the interaction point candidate xhit_cdt_m is calculated. Further, an expression representing a virtual wall surface is calculated. The virtual wall surface is a plane that includes the interaction point candidate xhit_cdt_m and has a normal parallel to a velocity vector of the racket at the interaction point candidate xhit_cdt_m.

Further, the bounce-back velocity (including the direction) of the ball in the case where the ball collides with the virtual wall surface at the aforesaid relative velocity is calculated. The bounce-back velocity may be calculated on an assumption that the velocity energy of the ball reduces by a predetermined amount, taking the elasticity of both the ball and the racket (head) into account. Then, the time-series predicted position x1'(t) of the ball is calculated according to a dynamic equation of the ball on the basis of the interaction point candidate xhit_cdt_m as the initial position and the bounce-back velocity as the initial velocity. As with the predicted position $x_1(t)$ of the ball free of an interaction, the existence probability density distribution P(x1'(t)) of the predicted position x1'(t) of the ball after an interaction is defined to have, for example, a weighted variance of a particle using a likelihood Pi(k) as the weight (refer to expression (002)).

Figure 8:
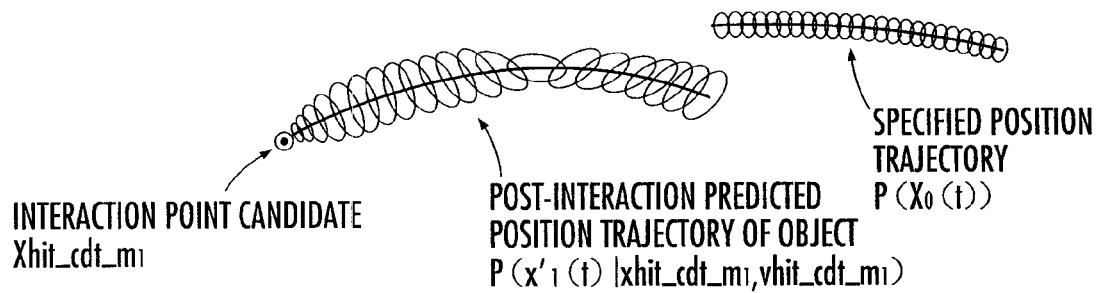
FIG. 8(a) to FIG. 8(c) are graphical illustrations related to predicted position trajectories of an object.
Figure 8:
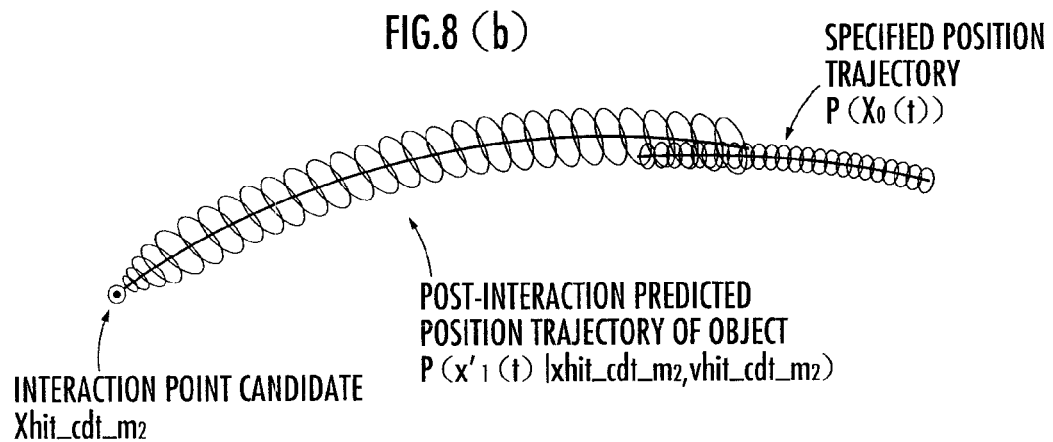
Figure 8:
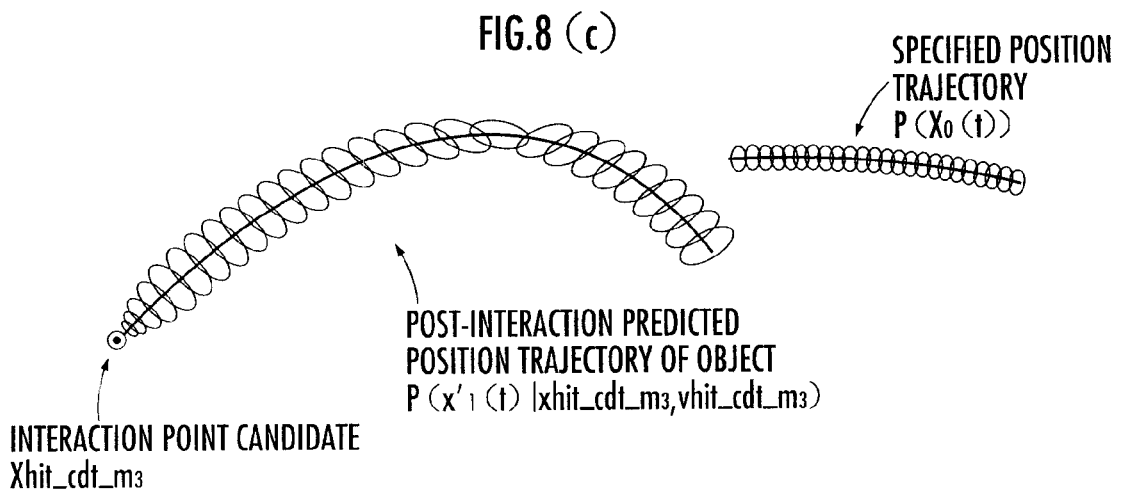

Thus, as illustrated in FIGS. 8(a) to 8(c), the post-interaction predicted position trajectory of the racket represented by the probability density distribution P(x1'(t)|xhit_cdt_m, vhit_cdt_m) of the time-series predicted position x1'(t) of the ball hit back by the racket at the interaction point candidate xhit_cdt_m is determined. The normal on the surface of the racket head and the tangent line of the position trajectory candidate of the racket are parallel to each other. The post-interaction predicted position trajectory of the ball has a spread based on the standard deviation or variance of the existence probability density distribution P(x1'(t) xhit_cdt_m, vhit_cdt_m), the mean predicted position μx1'(t) of the ball being the reference thereof.

Further, a third arithmetic processing element 130 calculates the degree of overlapping between the predicted position trajectory of the ball and each of a plurality of position trajectory candidates of the racket as a first degree of overlapping C1m (STEP231 of FIG. 7). To be more specific, the temporal integration value (refer to expression (003)) of the product of the probability density distribution $P(x_1(t))$ representing the predicted position trajectory of the ball and the probability density distribution $P(x_2(t)|xhit=xhit\_cdt\_m)$ representing each position trajectory candidate of the racket is calculated as the first degree of overlapping C1m. Also for calculating the first degree of overlapping C1m, one of the aforesaid strategies 1 to 3 may be adopted.

$$C1m = Intdt \cdot P(x_1(t))P(x_2(t)|xhit=xhit\_cdt\_m) \quad (003)$$

The third arithmetic processing element 130 calculates the degree of overlapping between the post-interaction predicted position trajectory of the ball and a specified position trajectory as a second degree of overlapping C2m (STEP232 of FIG. 7). The specified position trajectory of the ball is represented by a probability density distribution $P(x_0(t))$ indicating the likelihood associated with a time-series specified position $x_0(t)$, as illustrated in FIGS. 8(a) to 8(c). The specified position trajectory candidate of the ball has a spread based on the standard deviation or variance of the existence probability density distribution $P(x_0(t))$, the mean specified position or the central specified position $\mu x_0(t)$ of the ball being the reference thereof If the task is to move the object after interacting with a counter object to a desired position, then the specified position trajectory may be defined such that the spread at the desired position is zero or minimized.

To be more specific, the temporal integration value (refer to expression (005)) of the product of the probability density distribution $P(x1'(t)|xhit\_cdt\_m, vhit\_cdt\_m)$ representing the post-interaction predicted position trajectory of the ball and the probability density distribution $P(x_0(t))$ representing the specified position trajectory is calculated as the second degree of overlapping C2m.

$$C2m = Intdt \cdot P(x1'(t)|xhit\_cdt\_m, vhit\_cdt\_m)P(x_0(t)) \quad (005)$$

Further, the third arithmetic processing element 130 calculates a total degree of overlapping Cm based on the first degree of overlapping C1m and the second degree of overlapping C2m (STEP234 of FIG. 7). For example, the increasing function of each of the first degree of overlapping C1m and the second degree of overlapping C2m, such as the sum of the both degrees of overlapping, namely, C1m+C2m, the weighted sum $\lambda 1C1m+\lambda 2C2m$ ($\lambda 1>0$, $\lambda 2>0$, $\lambda 1+\lambda 2=1$) or the product thereof, namely, C1m·C2m, is calculated as the total degree of overlapping Cm.

The third arithmetic processing element 130 determines, as the desired position trajectory of the racket, the mean position trajectory or the central position trajectory of one position trajectory candidate whose total degree of overlapping Cm is the highest among a plurality of position trajectory candidates of the racket (STEP236 of FIG. 7).

Subsequently, the third arithmetic processing element 130 generates a behavior plan of the robot 1 that causes the position trajectory of the racket to coincide with the desired position trajectory (STEP238 of FIG. 7).

Then, the behavior control system 100 controls the behavior of the robot 1 according to the behavior plan (STEP240 of FIG. 7).

More specifically, the time-series position and the like of the racket are estimated according to the kinematics calculation method on the basis of the position of the racket in a hand coordinate system and kinematics parameters, such as the bending angles of the joint mechanisms indicated by output signals of an internal state sensor group 111. Then, the operations of the actuators 1000 are controlled according to a feedback control law such that the estimated values of the angles of the joint mechanisms and the position of the center of gravity of the robot 1 and the posture of a body 10 and the like at each time point agree with the desired values.

Thus, as illustrated in sequence in FIGS. 6(a) to 6(c), the robot 1 performs the task of hitting back the ball, which is bouncing and approaching, forward forehand by using the racket held by one of hands 13 thereby to displace the ball according to a specified position trajectory.

Before and after the robot 1 starts to move the racket, the series of processing after estimating the position of the aforesaid object, namely, the ball, is repeatedly carried out for each control cycle until the task is performed (refer to STEPS212 to 240 of FIG. 7).

(Method for Estimating the Position of the Ball)

The method for estimating the position of the ball will now be explained in detail (refer to STEP112 of FIG. 3 and STEP212 of FIG. 7).

A particle filter is used to estimate the position of the ball. Particles include first-class particles and second-class particles to which models representing different motion states of the ball are assigned. A first model representing a state wherein the ball is in a motion while being in contact with no other object, such as a floor, is assigned to the first-class particles. A second model representing a state wherein the ball is in motion while being in contact with another object, such as a floor or a wall, is assigned to the second-class particles.

Figure 9:
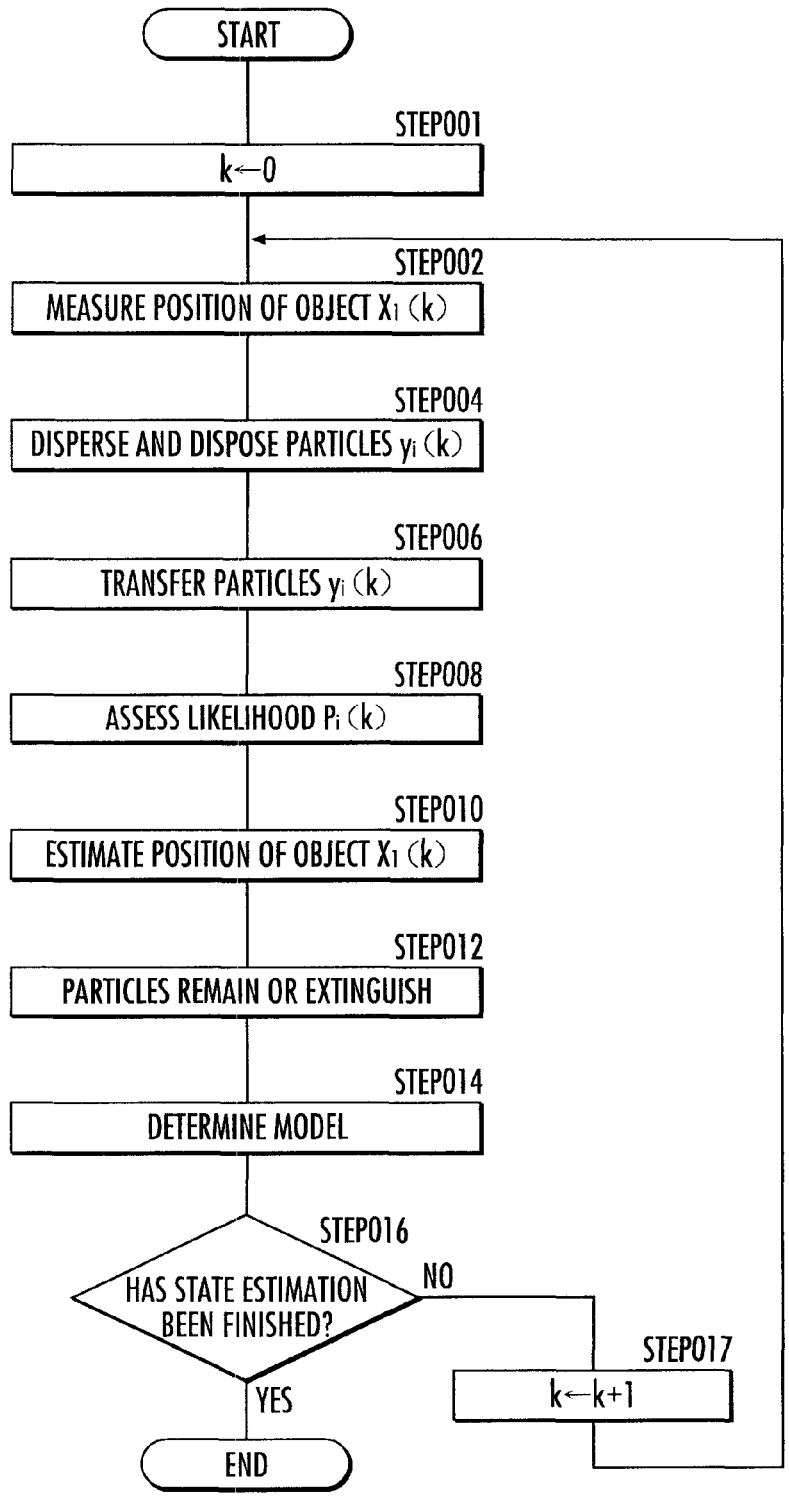
FIG. 9 is a flowchart illustrating a method for estimating the position of an object.

An index k, which denotes an estimation arithmetic processing cycle or time is reset to zero (STEP001 of FIG. 9), then the ball position $x_1(k)$ at time k is measured on the basis of an image captured by an imaging device, such as a CCD camera, serving as an external state sensor group 111 (STEP002 of FIG. 9).

Further, a plurality of particles $y_i(k)$ (i=1, 2, . . . ) is dispersed and disposed in a state space (STEP004 of FIG. 9). Except for an initial state (k=0), some of the plurality of particles $y_i(k)$ are dispersed at arbitrary current positions in a range based on a probability density distribution (normal distribution or Gaussian distribution) expanding with a previous position in the state space being the reference thereof.

Figure 10:
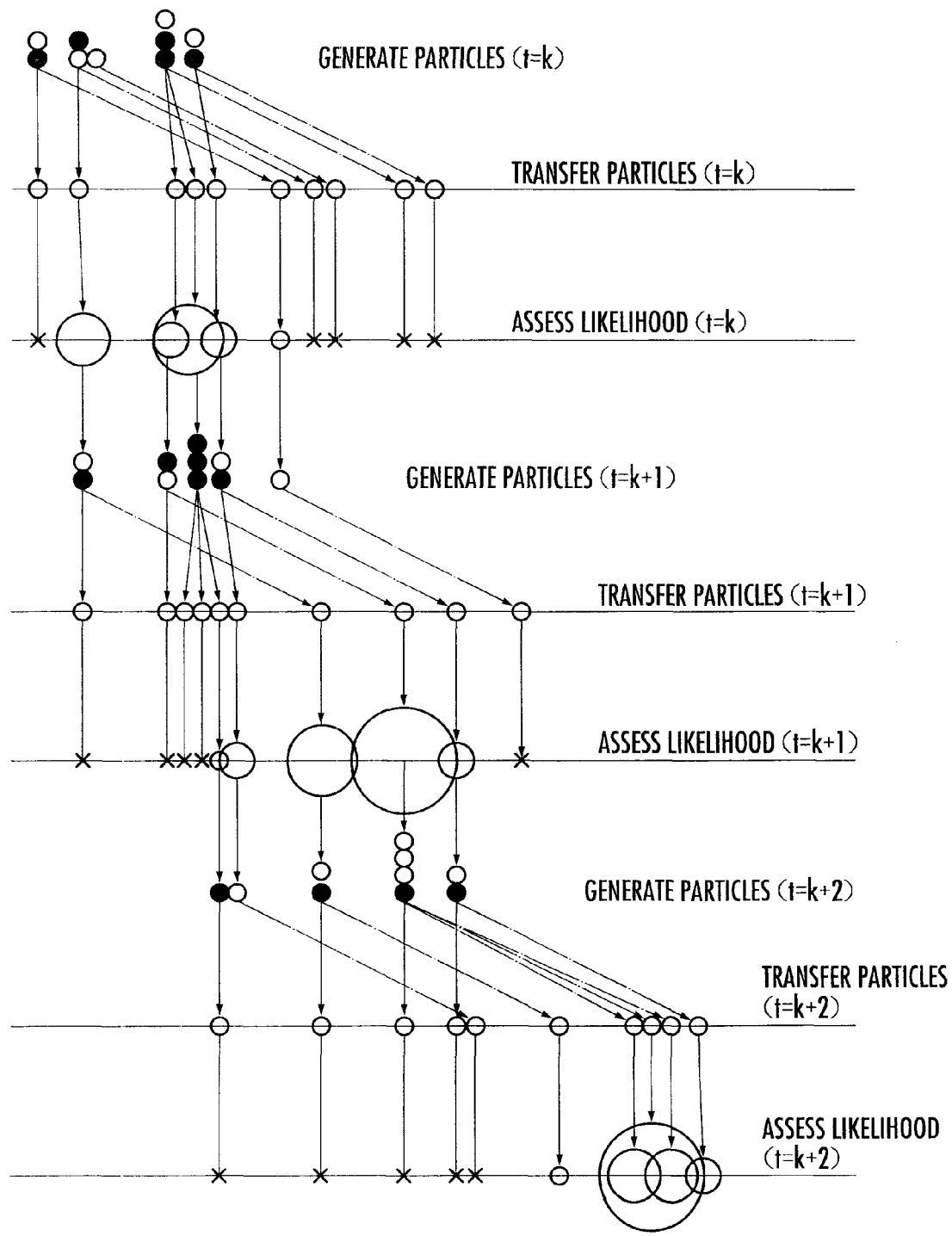
FIG. 10 is a graphical illustration related to a method for generating a particle filter.
Figure 11:
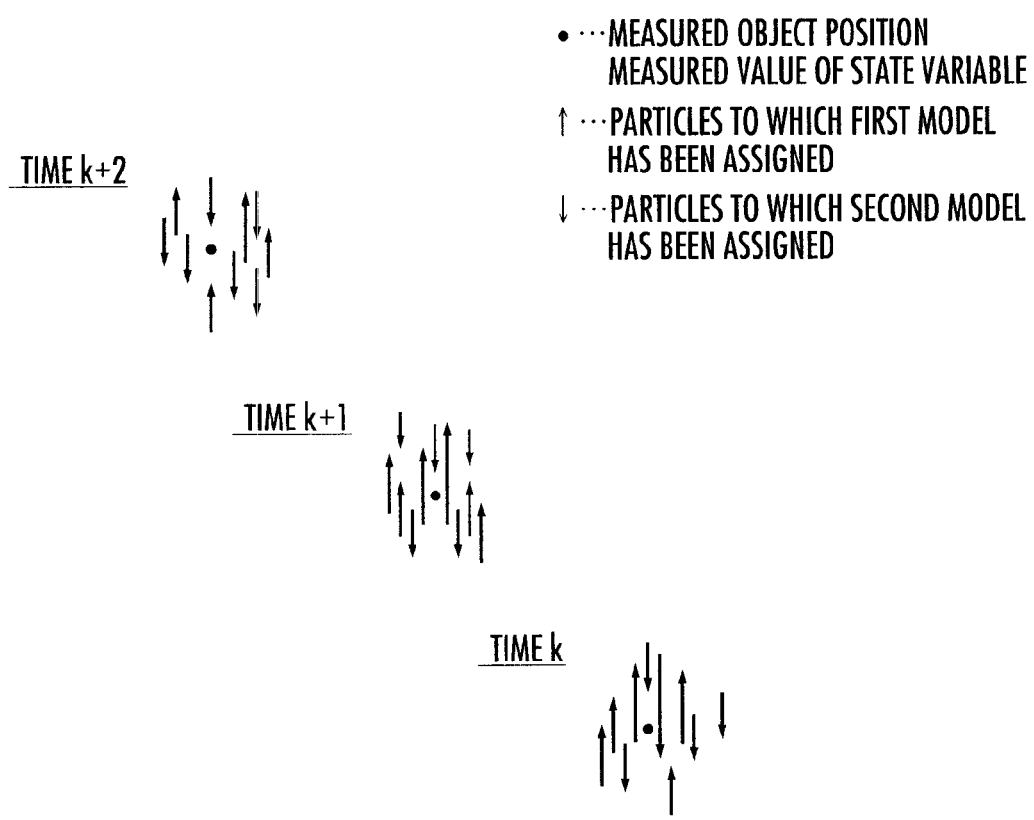
FIG. 11 is a graphical illustration related to a method for generating a particle filter.

Thus, first-class particles (black dots) and second-class particles (white dots) are disposed in the state space, as conceptually illustrated in FIG. 10. Further, as illustrated in FIG. 11, the first-class particles (upward arrows) and the second-class particles (downward arrows) are dispersed and disposed around measured values (black dots) of state variables.

Figure 12:
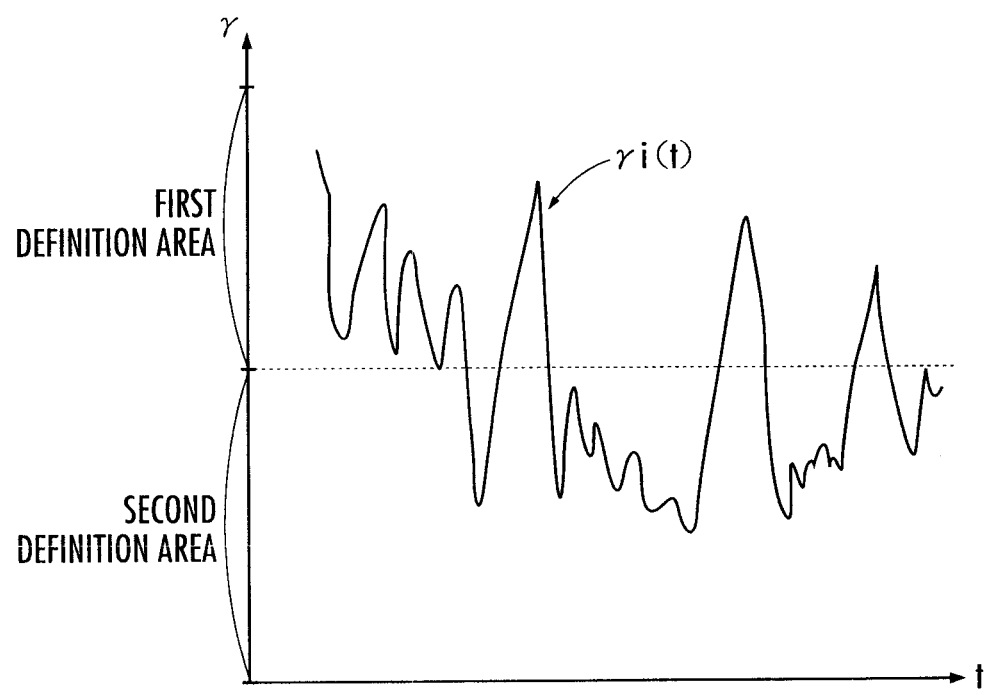
FIG. 12 is a graph related to a model variable.

Each particle $y_i(k)$ has a model variable $_{Y_i}(k)$, the value of which fluidly changes, as illustrated in FIG. 12. If the value of the model variable $_{Y_i}(k)$ belongs to a first definition area, then the first model is assigned as a unique model to the particle $y_i(k)$. If the value of the model variable $_{Y_i}(k)$ belongs to a second definition area, then the second model is assigned as a unique model to the particle $y_i(k)$.

The selectable model type may differ for each particle $y_i(k)$. For example, one of the first model and the second model may be selected as the unique model for some particles. While one of the first model and a third model, which is different from the second model, may be selected as the unique model for the remaining particles.

Further, each particle $y_i(k)$ is transferred in the state space according to the unique model (STEP006 of FIG. 9). Thus, the first-class particles indicated by black dots and the second-class particles indicated by white dots are transferred from previous positions and disposed at current positions in the state space, as illustrated in FIG. 10.

Then, the likelihood $Pi(k)=P(y_i(k)|x_i(k))$ of each particle $y_i(k)$ relative to the measured ball position $x_1(k)$ is assessed (STEP008 of FIG. 9). Thus, the likelihoods Pi(k) are calculated, the levels of which are represented by the magnitudes of the diameters of the particles in FIG. 8.

Subsequently, a weighted mean value $\Sigma_i Pi(k) \cdot y_i(k)/\Sigma_i y_i(k)$ of each particle $y_i(k)$ using the likelihood Pi(k) as the weight is estimated as the ball position $x_1(k)$ (STEP010 of FIG. 9).

Alternatively, for example, a particle $y_i(k)$ whose likelihood $Pi(k)$ becomes a maximum or the mean value of particles $y_i(k)$ whose likelihoods $Pi(k)$ are within predetermined high ranks or a weighted mean value using the likelihood $Pi(k)$ as the weight may be estimated as the ball position $x_1(k)$.

Further, based on the likelihood (or the probability density distribution) $Pi(k)$ of each particle discretely expressed relative to the ball position $x_1(k)$ at time k, it is determined whether each particle $y_i(k)$ should be allowed to remain or should be extinguished or split up (STEP012 of FIG. 9). Thus, particles with higher likelihoods $Pi(k)$ preferentially remain or increase, while particles with lower likelihoods $Pi(k)$ are preferentially extinguished.

Thereafter, based on the unique model (the current model) assigned to each remaining particle $y_i(k)$, a new unique model (the next model) is determined (STEP014 of FIG. 9).

To be more specific, a current model variable value $_{\gamma_i}(k)$ unique to each particle $y_i(k)$ is increased or decreased by a perturbation amount $\delta_1(k)$ thereby to determine the next model variable value $_{\gamma_i}(k+1)$. If the next model variable value $_{\gamma_i}(k+1)$ belongs to the first definition area, then the first model will be determined as the next unique model. Similarly, if the next model variable value $_{\gamma_i}(k+1)$ belongs to the second definition area, then the second model will be determined as the next unique model. The perturbation amount $\delta_i(k)$ is adjusted to fall within a predetermined permissible range.

After that, it is determined whether the processing for estimating the ball position $x_1(k)$ has been terminated (STEP016 of FIG. 9). If it is determined that the estimation processing has not been terminated (NO in STEP016 of FIG. 9), then the index k is incremented by 1 (STEP017 of FIG. 9), and the aforesaid series of processing, such as the measurement of the ball position $x_1(k)$ and the assessment of the likelihood $Pi(k)$, is repeated (refer to STEP002 to 016 of FIG. 9).

This completes the detailed explanation of the method for estimating the ball position.

Alternatively, depending on the time-series ball position (e.g., vertical position), a state wherein only the first-class particles exist (a state of free fall), a state wherein the first-class particles and the second-class particles are mixed (a state of contact with a floor or the like), and a state wherein only the second-class particles exist may be selectively switched.

(Stochastic Transition Model)

A stochastic transition model based on which a racket position trajectory candidate is generated will now be described in detail.

The stochastic transition model is a model which represents a state in which the racket position and the first to n-th order temporal differential values thereof continuously change according to the shape property of an exemplary position trajectory of the racket.

The shape property of an exemplary position trajectory $Q^i$ of the racket is defined by an attractor matrix R (factor) represented by expression (100). The calculation method for the attractor matrix R is described in, for example, "Trajectory Representation Using Sequenced Linear Dynamical Systems, K. R. Dixon and P. K. Khosla, Proceedings of the IEEE International Conference on Robotics and Automation (2004)."

$$R = (Q\tilde{}(k+1) - Q\tilde{}(k))(Q\tilde{}(k) - Q\tilde{}(N))^+,$$

$$Q\tilde{}(k) = [Q_1(1) \ldots Q_1(N\_1-1) \ldots Q_1(N\_1-1) \ldots Q_i(1) \ldots Q_1(N\_i-1) \ldots Q_x(1) \ldots Q_x(N\_x-1)],$$

$$Q\tilde{}(k+1) = [Q_1(2) \ldots Q_1(N\_1) \ldots Q_i(2) \ldots Q_1(N\_i) \ldots Q_x(2) \ldots Q_x(N\_x)],$$

$$Q\tilde{}(N) = [Q_1(N\_1) \ldots Q_1(N\_1) \ldots Q_i(N\_i) \ldots Q_i(N\_i) \ldots Q_i(N\_i) \ldots Q_x(N\_x) \ldots Q_x(N\_x)] \tag{100}$$

Here, "+" denotes a pseudo inverse matrix, "N_i" denotes the length of an i-th trajectory. The shape property of the exemplary position trajectory $Q^i$ of the racket defined by the attractor matrix R is represented by expressions (111) and (112).

$$v_2(k) = Rx_2(k) - Ru(k) + N(\mu_v, \Sigma_v) \tag{111}$$

$$u(k+1) = u(k) + \epsilon(k) + N(\mu_u, \Sigma_u) \tag{112}$$

Expression (111) indicates that the level of the racket velocity $v_2(k)$ at time k depends on the magnitude of a deviation of the racket position $x_2(k)$, which uses an attractor point $u(k)$ of an attractor at time k as the reference thereof, and an attractor matrix R, and that the racket velocity $v_2(k)$ is a continuous random variable having a fluctuation or uncertainty denoted by a probability density distribution (Gauss distribution in general) $N(\mu_{v2}, \Sigma_{v2})$ ($\mu_{v2}=0$; $\Sigma_{v2}$: covariance matrix). In other words, the level and the degree of fluctuation of the racket displacement velocity $v_2(k)$ at time k are defined by the attractor matrix R.

Expression (112) indicates that the attractor point $u(k)$ is allowed to be displaced by the displacement amount $\epsilon(k)$ and that the attractor point $u(k)$ is a continuous random variable having an uncertainty denoted by a probability density distribution $N(\mu_u, \Sigma_u)$ ($\mu_u 0$; $\Sigma_u$: covariance matrix). The second term of the right side in expression (112) may be omitted.

The stochastic transition model is defined by expressions (121) to (123).

$$x_2(k+1) = x_2(k) + v_2(k+1) + N(\mu_{x2}, \Sigma_{x2}) \tag{121}$$

$$v_2(k+1) = v_2(k) + \alpha_2(k+1) + N(\mu_{v2}, \Sigma_{v2}) \tag{122}$$

$$\alpha_2(k+1) = \alpha_2(k) + \beta_2(k+1) + N(\mu_{\alpha2}, \Sigma_{\alpha2}) \tag{123}$$

Expression (121) indicates the property of a stochastic transition model, which ensures smooth shifts of the racket position $x_2(k)$ and also indicates that the position $x_2(k)$ is a continuous random variable having an uncertainty denoted by a probability density distribution $N(\mu_{x2}, \Sigma_{x2})$ ($\mu_{x2}=0$; $\Sigma_{x2}$: covariance matrix).

Expression (122) indicates the property of the stochastic transition model, which ensures smooth changes in the racket displacement velocity (firs-order temporal differential value of the position) $v_2(k)$ and also indicates that the displacement velocity $v_2(k)$ is a continuous random variable having an uncertainty denoted by a probability density distribution $N(\mu_{v2}, \Sigma_{v2})$ ($\mu_{v2}=0$; $\Sigma_{v2}$: covariance matrix).

Expression (123) indicates the property of the stochastic transition model, which ensures smooth changes in the racket displacement acceleration (second-order temporal differential value of the position) $\alpha_2(k)$ and that the displacement acceleration $\alpha_2(k)$ is a continuous random variable having an uncertainty denoted by a probability density distribution $N(\mu_{\alpha a}, \Sigma_{\alpha 2})$ ($\mu_{\alpha 2}=0$; $\Sigma_{\alpha 2}$: covariance matrix). Here, $\beta_2(k)$ denotes a jerk (third-order temporal differential value ($=d^3x_2/dt^3$)) of the racket position. The second term of the right side in expression (123) may be omitted.

A stochastic transition model which represents a behavior of the robot 1 in which the racket position $x_2$ and one or a plurality of n-th order temporal differential value or values continuously change, such as a case where the racket position $x_2$ and the displacement velocity $v_2$ thereof or the displacement acceleration $\alpha_2$ and the displacement jerk $\beta_2$ continuously change, may be adopted in place of the stochastic transition model representing the behavior of the robot 1 in which the racket position $x_2$ and the displacement velocity (first order temporal differential value) $v_2$ and the acceleration (second order temporal differential value) $\alpha_2$ thereof continuously change.

Figure 13:
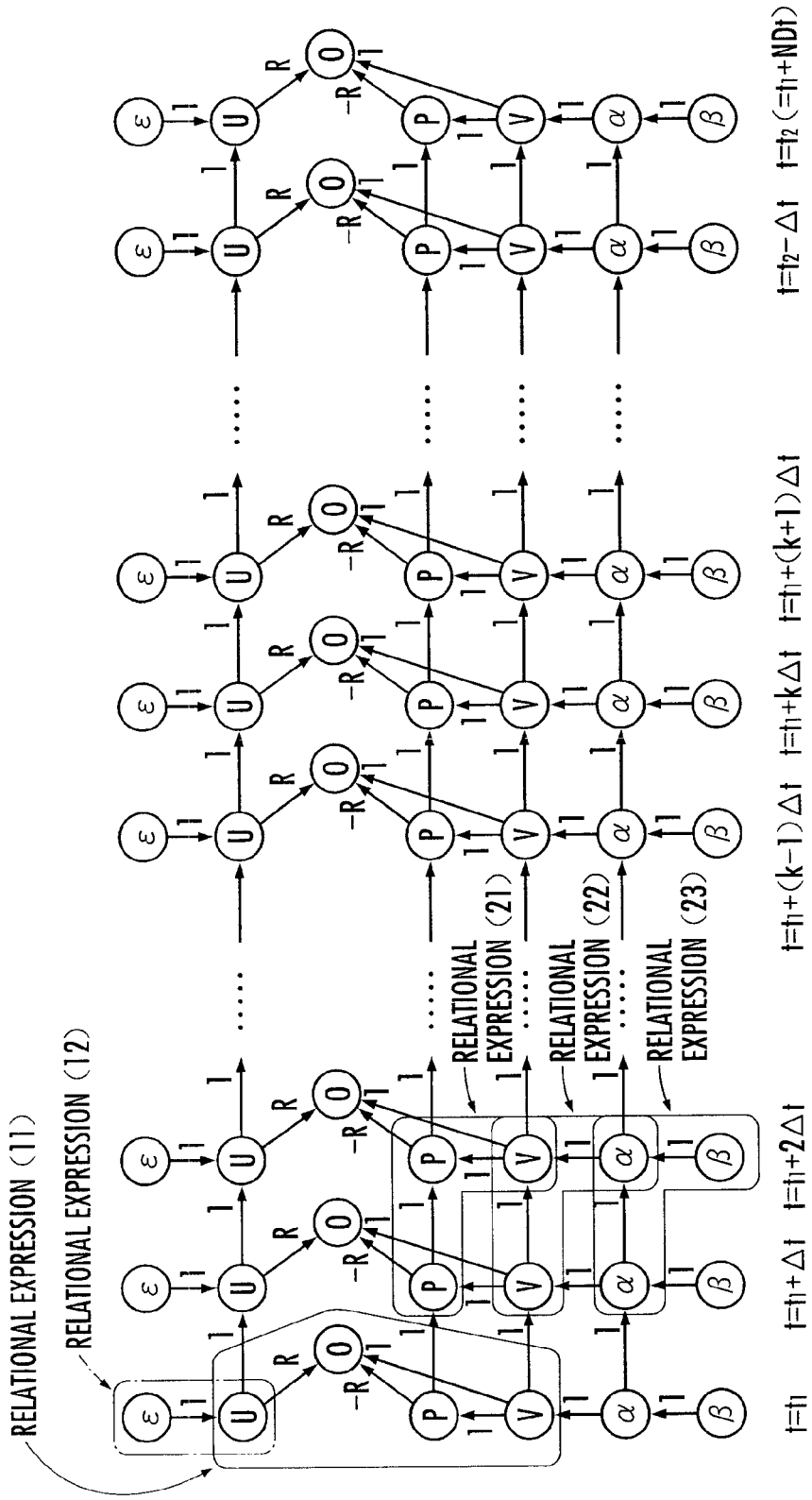
FIG. 13 is a graphical illustration related to a method for generating a position trajectory candidate of a counter object.

The stochastic transition model is expressed by the Dynamics Bayesian Network (DBN) illustrated in FIG. 13. According to the DBN, the relational expressions (111), (112) and (121) to (123) are represented by arrows connecting nodes (circles) indicating state variables, such as the racket positions $x_2$ and the attractor points u at each time point t, and conditional probabilities. Further, the conditional probabilities corresponding to the relational expressions (111), (112) and (121) to (123), respectively, are represented by relational expressions (211), (212) and (221) to (223), respectively.

$$P(0|V_2(k), x_2(k)) = N(v_2(k) - Rx_2(k) + Ru(k), 0) = N(0,0) \quad (211)$$

$$P(u(k+1)|u(k), \epsilon(k)) = N(u(k) + \epsilon(k), \Sigma_u) \quad \ldots (212)$$

$$P(x_2(k+1)|x_2(k), v_2(k+1)) = N(x_2(k) + v_2(k+1), \Sigma_{x2}) \quad (221)$$

$$P(v_2(k+1)|v_2(k), \alpha_2(k)) = N(v_2(k) + \alpha_2(k+1), \Sigma_{v2}) \quad (222)$$

$$P(\alpha_2(k+1)|\alpha_2(k), \beta_2(k)) = N(\alpha_2(k) + \beta_2(k+1), \Sigma_{\alpha 2}) \quad (223)$$

The state variable node $\epsilon$ in expression (212) is represented by expression (312). The state variable node $\beta$ in expression (123) is represented by expression (323).

$$P(\epsilon(k)) = N(0, \Sigma_\epsilon) \quad (312)$$

$$P(\beta(k)) = N(0, \Sigma_\beta) \quad (323)$$

(Method for Generating the Position Trajectory Candidate of a Counter Object)

The processing for generating the position trajectory candidate of the racket (counter object) will now be described in detail (refer to STEP124 of FIG. 3 and STEP224 of FIG. 7).

The position trajectory candidate of the racket is generated by generating a forward estimated position trajectory and a reverse estimated position trajectory of the racket according to the stochastic transition model described above and then combining the probability density distributions of the trajectories.

First, in the DBN, the position $x_2$, the velocity $v_2$, the acceleration $\alpha_2$, and the jerk $\beta_2$ of the racket at a first reference time point (the time point when the robot 1 begins to move the racket) $t=t_1$ and a second reference time point $t=t_2$ ($=t_1+N\Delta t$) (the time point when the robot 1 finishes swinging the racket), respectively, are set. For example, the position $x_2(0)$ of the racket at the first reference time point $t=t_1$ when the robot 1 starts to move the racket, as illustrated in FIG. 6(*a*), is set according to the kinematics calculation method on the basis of the angles of the joint mechanisms and the like. The displacement velocity $v_2(0)$, the acceleration $\alpha_2(0)$, and the jerk $\beta_2(0)$ of the racket position P(0) at the first reference time point $t=t_1$ are all set to zero. Further, the desired position of the racket at the instant the robot 1 completes the swing of the racket, as illustrated in FIG. 6(*c*), is set as the racket position P(N) at the second reference time point $t=t_2$. The position P(N) of the racket at the second reference time point $t=t_2$ may be set within a range in the vicinity of the attractor point u(0) at the first reference time point $t=t_1$. The velocity $v_2(N)$, the acceleration $\alpha_2(N)$, and the jerk $\beta_2(N)$ of the racket at the second reference time point $t=t_2$ are all set to zero.

Further, the nodes from the first reference time point $t=t_1$ to the second reference time point $t=t_2$ is estimated in sequence in the time-series forward direction (a direction from a time point ahead to a time point behind) according to the stochastic transition model represented by relational expressions (111), (112) and (121) to (123).

Figure 14:
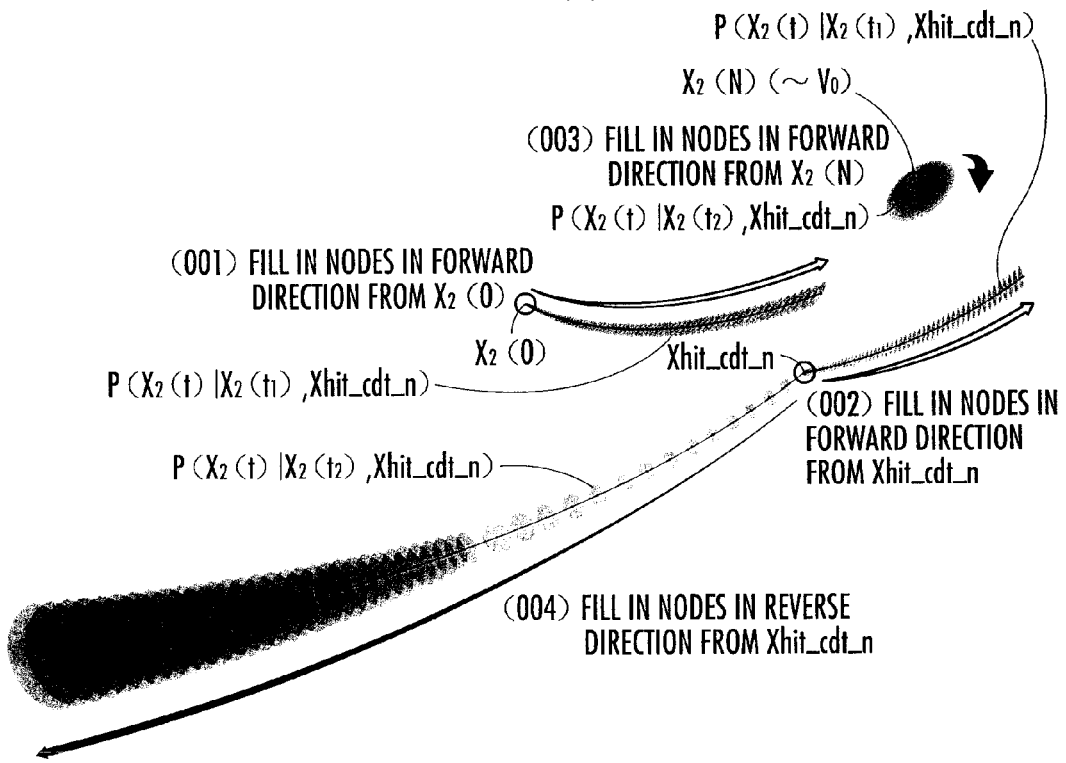
FIG. 14(a) and FIG. 14(b) are graphical illustrations related to a stochastic transition model (DBN)
Figure 14:
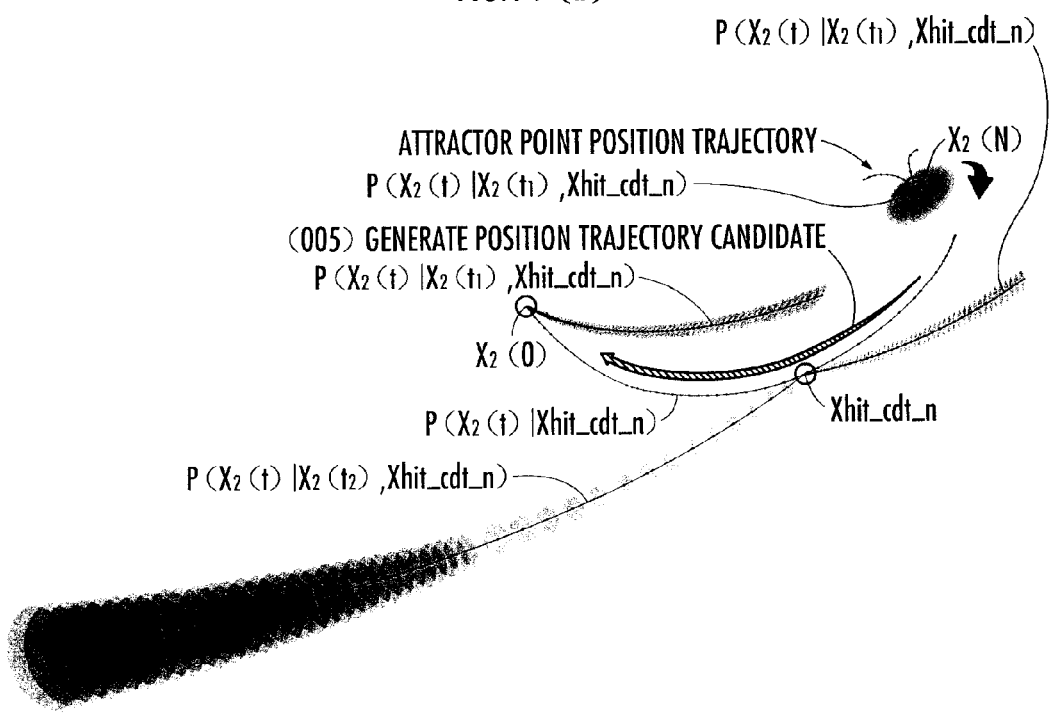

For example, as illustrated in FIG. 14(*a*), racket positions $x_2^+(0)(=x_2(t_1)), x_2^+(1), x_2^+(2), x_2^+(h\_cdt\_m-1)$ are estimated in sequence in the time-series forward direction (refer to the white arrow) from (001) first reference time point $t=t_1$ (the time point when the movement of the racket is begun) to a time point $t=t_1+(h\_cdt\_m-1)\Delta t$ immediately before an n-th interaction time point candidate $t=thit\_cdt\_m=t_1+h\_cdt\_m\Delta t$.

Similarly, as also illustrated in FIG. 14(*a*), racket positions $x^+(h\_cdt\_m)(=x_2(h\_cdt\_m))$, $x_2^+(h\_cdt\_m+1)$, $x_2^+(h\_cdt\_m+2), x_2^+(N)$ are estimated in sequence in the time-series forward direction (refer to the white arrow) from (002) interaction time point candidate $t=thit\_cdt\_m$ to the second reference time point $t=t_2=t_1+N\Delta t$ (the time point upon the completion of the racket swing).

Thus, the estimated position trajectory in the forward direction expressed by the probability density distribution $P(x_2(t)|x_2(t_1), xhit\_cdt\_m)$ of the estimated racket positions $x_2^+(0)$, $x_2^+(1)$, $x_2^+(h\_cdt\_m-1)$, $x_2^+(h\_cdt\_m)$, $x_2^+(h\_cdt\_m+1), \ldots, x_2^+(N)$ is generated.

En a similar manner, the nodes from the second reference time point $t=t_2$ to the first reference time point $t=t_1$ is estimated in sequence in the time-series reverse direction (a direction from a time point behind to a time point ahead) according to the stochastic transition model.

For example, as illustrated in FIG. 14(*a*), racket positions $x_2^-(N)(=x_2(t_2)), x_2^-(N-1), x_2^-(N-2), \ldots, x_2(h\_cdt\_m\Delta t+1)$ are estimated in sequence in the time-series reverse direction (refer to the black arrow) from (003) second reference time point $t=t_2$ to a time point $t=thit\_cdt\_m+\Delta t=t_1+(h\_cdt\_m+1)\Delta t$ immediately after an interaction time point candidate $t=thit\_cdt\_m$.

Similarly, as also illustrated in FIG. 14(*a*), racket positions $x_2^-(h\_cdt\_m)(=xhit\_cdt\_m)$, $x_2^-(h\_cdt\_m-1)$, $x_2^-(h\_cdt\_m-2), \ldots, x_2^-(0)$ are estimated in sequence in the time-series reverse direction (refer to the black arrow) from (004) interaction time point candidate $t=thit\_cdt$ to the first reference time point $t=t_1$.

Thus, the estimated position trajectory in the reverse direction expressed by the probability density distribution $P(x_2(t)|x_2(t_2), xhit\_cdt\_m)$ of the estimated racket positions $x_2^-(N), x_2^-(N-1), \ldots, x_2^-(h\_cdt\_m+1), x_2^-(h\_cdt\_m), x_2^-(h\_cdt\_m-1), \ldots, x_2^-(0)$ is generated.

In addition to the method described above, which is called Belief Propagation, there are other methods that can be used for estimating nodes in the DBN, such as Loopy Belief Propagation, Variable Elimination, Junction Tree, Importance Sampling, Hugin Algorithm, Shafer-Shenoy Algorithm, Variational Message Passing, and Gibbs Sampling.

Further, as illustrated in FIG. 14(*b*), a probability density distribution $P(x_2(t)|x_2(t_1), xhit\_cdt\_m)$ representing (005) forward estimated position trajectory and a probability density distribution $P(x_2(t)|x_2(t_2), xhit\_cdt\_m)$ representing a reverse estimated position trajectory are combined thereby to generate the position trajectory candidate of the racket represented by the combined probability density distribution $P(x_2(t)|xhit\_cdt\_m)$.

At the interaction point candidate xhit_cdt_m, the probability density distribution of the position trajectory candidate of the racket is set such that the standard deviation or variance thereof is smaller (e.g., zero) than that of the probability density distributions at other points. This is because the position trajectory candidates of the racket have to be set to pass the interaction point candidate xhit_cdt_m. For example, the probability density function at the interaction point candidate xhit_cdt_m exhibits a characteristic like a δ function.

Therefore, when the degree of overlapping Ci or the first degree of overlapping C1m is calculated (refer to STEP 131 of FIG. 3 and STEP231 of FIG. 7), the interaction point candidate xhit_cdt_m may become a unique point, leading to deteriorated reliability of the degree of overlapping Ci. This, however, will be avoided by employing the strategies described above.

For one interaction point candidate xhit_cdt_m, a plurality of racket position trajectory candidates directed to different time-series forward directions are generated from the interaction point candidate xhit_cdt_m. If, for example, the direction from which the ball comes as observed from the robot 1 is denoted by an azimuth θ=0[rad] and an elevation angle φ=0[rad], then nine directions denoted by (θ, φ)=(0, 0), (0, −π/4), (0, π/4), (−π/4, 0), (π/4, 0), (−π/4, −π/4), (π/4, −π/4), (−π/4, π/4), and (π/4, π/4), respectively, are used as the aforesaid different directions. The plurality of directions may be arbitrarily changed, and only one racket position trajectory candidate may be generated for one interaction point candidate xhit_cdt_m.

Alternatively, for example, instead of combining a forward estimated position trajectory and a reverse estimated position trajectory of the racket at every time point, the position trajectory candidate of the racket may be generated by connecting a first position trajectory, which is a part of a forward estimated position trajectory during a first period of time t=0 to k, and a second position trajectory, which is a part of a reverse estimated position trajectory during a second period of time t=k+1 to N following the first period of time, such that the first and the second position trajectories smoothly connect spatially.

Further alternatively, an intermediate position trajectory of the racket may be generated during an intermediate period of time t=k+1 to k+c−1 such that the first position trajectory, which is a part of the forward estimated position trajectory during the first period of time t=0 to k, and the second position trajectory, which is a part of the reverse estimated position trajectory during a second period of time t=k+c (c>1) to N following the first period of time smoothly connect, and then the first position trajectory, the intermediate position trajectory, and the second position trajectory may be connected in order so as to generate the position trajectory candidate of the racket.

(Method of Learning the Exemplary Position Trajectory of a Counter Object)

An exemplary position trajectory $Q^i$ of a counter object may be set beforehand, or may be determine by observing the behavior of an instructor, as will be described below.

Figure 15:
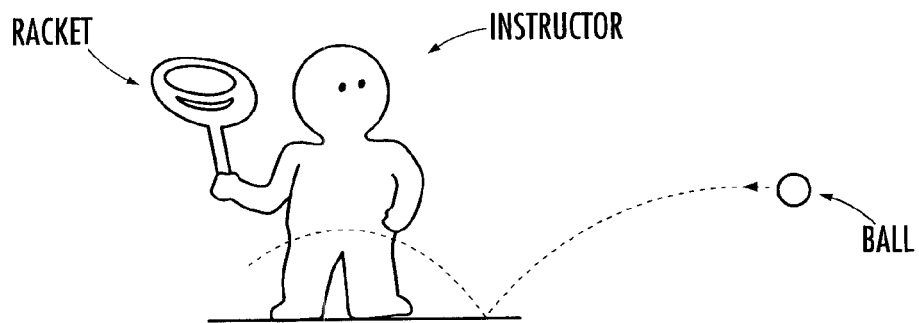
FIG. 15(a) to FIG. 15(c) are graphical illustrations related to a method for learning an exemplary position trajectory of a counter object.
Figure 15:
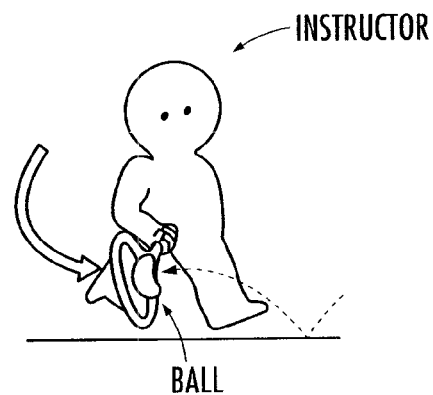
Figure 15:
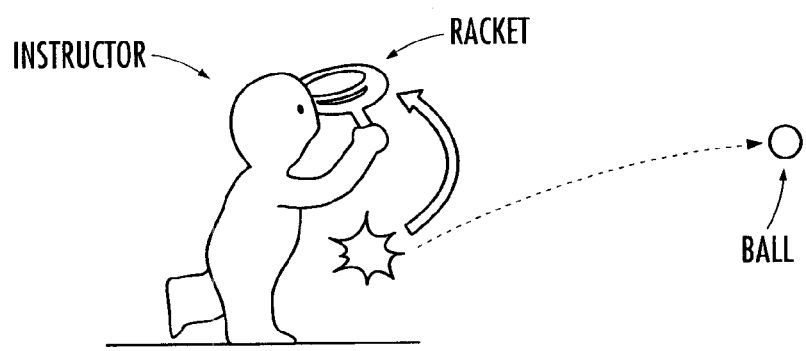

Here, the behavior of a human being acting as an instructor performing a task of hitting back a moving ball forehand with a racket held in his or her one hand, as illustrated in FIGS. 15(a) to 15(c) will be observed. FIG. 15(a) illustrates a state immediately before the instructor starts moving the racket, and FIG. 15(b) illustrates a state in which the ball is in contact with the instructor's racket. FIG. 15(c) illustrates a state wherein the instructor has completed a swing of the racket.

First, each time the instructor repeats the task, the time-series positions of the racket serving as the counter object are measured. Thus, an exemplary position trajectory $Q_i=[Q_i(0), \ldots, Q_i(k), \ldots, Q_i(N)](i=1, 2, \ldots, I)$ of the racket position is recognized. "$Q_i(k)$" means the racket position at time point k in an i-th exemplary position trajectory $Q_i$.

Because of the nature of the task of hitting the ball against the racket, the racket position and the ball position at the time point when the instructor hits the ball against the racket (refer to FIG. 15(b)) may be measured. The measurement results can be used when setting the interaction point candidate xhit_cdt_m (refer to STEP124 of FIG. 3, STEP224 of FIG. 7, and FIG. 4(b)). The time point when the change in the ball velocity measured by the image analysis obtained through a camera constituting a motion capture system exceeds a threshold value is recognized as the time point when the ball is hit back by the racket. Alternatively, the time point when the sound produced when the ball hits the racket is detected through a microphone (not shown) may be recognized as the time point when the ball hits the racket.

The position of the racket moved by the instructor is measured by an optical motion capture system. According to the optical motion capture system, the racket position is measured on the basis of the result of detection of a mark at the location of an object to be observed by a single or a plurality of cameras (trackers) disposed around the instructor.

Alternatively, the racket position may be measured by a mechanical, magnetic or inertial motion capture system.

A mechanical motion capture system measures the racket position according to the kinematics calculation method of the instructor on the basis of output signals, which indicate the angles of joints of the instructor, from a plurality of potentiometers attached to a supporter or a suit on the instructor.

A magnetic motion capture system measures the racket position according to the kinematics calculation method of the instructor on the basis of output signals from a plurality of magnetic sensors attached to a supporter or a suit on the instructor.

An inertial motion capture system measures the racket position according to the kinematics calculation method of the instructor on the basis of output signals indicating the inertial moments of arms or the like from a plurality of inertial moment sensors attached to a supporter or a suit on the instructor.

A position trajectory corrected by multiplying the ratio of the motion scale of the racket moved by the robot 1 with respect to the motion scale of the racket moved by the instructor by an exemplary position trajectory of the racket moved by the instructor may be adopted as the exemplary position trajectory of the racket for the robot 1.

Further, for example, the ratio of the scale of the racket including the position of the racket moved by the robot 1 (agent) with respect to the scale of the exemplary position trajectory of a first state variable, which includes the position of the racket moved by the instructor, may be adjusted by multiplying the ratio of the sum of the length of the arm 12 of the robot 1 to the length of the racket used by the robot 1 with respect to the sum of the length of an arm of the instructor and the length of the racket used by the instructor by an attractor matrix R.

(Advantages of the Behavior Control System)

The behavior control system 100 according to the first embodiment calculates the degree of overlapping Ci of the time-series probability density distribution between a predicted position trajectory of the object (ball) and the position trajectory candidate of the counter object (racket) (refer to STEP131 of FIG. 3 and FIGS. 5(a) to 5(c)). Further, the behavior plan of the agent (the robot 1) is generated such that the counter object is moved according to a desired position trajectory, which is a position trajectory candidate having the highest degree of overlapping Ci with the predicted position trajectory of the object among a plurality of position trajectory candidates of the counter object (refer to STEP136 and STEP138 of FIG. 3). The degree of overlapping Ci indicates the level of probability of interaction between the counter object and the object.

Hence, controlling the controlling the behavior of the agent according to the behavior plan determined as described above makes it possible to enable the agent to securely carry out a task for moving the counter object while effecting interaction with the object (refer to FIGS. 6(a) to 6(c)).

The behavior control system 100 according to the second embodiment calculates the degree of overlapping of the time-series probability density distribution between the predicted position trajectory of the object (ball) and the position trajectory candidate of the counter object (racket) as the first degree of overlapping C1m (refer to STEP231 of FIG. 7 and FIGS. 5(a) to 5(c)). Further, the degree of overlapping of the time-series probability density distribution between the post-interaction predicted position trajectory of the object and a specified position trajectory is calculated as the second degree of overlapping C2m (refer to STEP232 of FIG. 7 and FIGS. 8(a) to 8(c)). Further, the total degree of overlapping Cm based on the first degree of overlapping C1m and the second degree of overlapping C2m is calculated (refer to STEP234 of FIG. 7).

Then, among the plurality of position trajectory candidates, a position trajectory candidate having the highest total degree of overlapping Cm is determined as the desired position trajectory of the counter object, and the behavior plan of the agent (the robot 1) is generated such that the counter object is moved according to the desired position trajectory (refer to STEP236 and STEP238 of FIG. 7).

The level of the degree of first overlapping C1m indicates the level of the probability of the interaction between the counter object and the object at the interaction point candidate xhit_cdt_m. The level of the degree of second overlapping C2m indicates the level of probability of the object being displaced along a specified position trajectory after interacting with the counter object at the interaction point candidate xhit_cdt_m. This means that the level of the total degree of overlapping based on the above two degrees of overlapping indicates the level of the probability of the interaction between the counter object and the object and the probability of the object being displaced along the specified position trajectory after interacting with the counter object.

Thus, controlling the controlling the behavior of the agent according to the behavior plan generated as described above makes it possible to enable the agent to securely carry out the task of causing the object to be displaced along a specified position trajectory by moving the counter object so as to effect interaction with the object (refer to FIGS. 6(a) to 6(c)).

Further, the position of the counter object is allowed to vary or fluctuate on the basis of the spread of the probability density distribution, so that the agent is also allowed to have a motion pattern variation within a range in which the aim to carry out a task is fulfilled. To be more specific, at an interaction point (the interaction point candidate xhit_cdt_m) where it is highly necessary to prohibit or restrict the agent from changing its behavior pattern in order to cause the agent to carry out a task, the change of the behavior pattern is prohibited or restricted, thereby enabling the agent to securely carry out the task. Meanwhile, at the time point when the need for such prohibition or restriction is low for the agent to carry out the task, the agent is allowed to change its behavior pattern over a relatively wide range, thus enabling the agent to avoid being forced to perform a structurally strained or inefficient behavior.

The stochastic transition model expressed by the DBN (refer to FIG. 13) based on which a position trajectory candidate of the counter object is generated follows a factor indicative of the shape property of an exemplary position trajectory of the counter object, such as the characteristic of the behavior of the instructor when the instructor moves a counter object to cause the counter object to interact with an object. Further, the stochastic transition model indicates a behavior of the agent in which the position of the counter object and the first to the n-th order temporal differential values (n=1, 2, . . . ) thereof continuously change.

Thus, the shape property of the exemplary position trajectory of a state variable and spatial and temporal continuity can be imparted to the position trajectory candidate of the counter object generated according to the stochastic transition model. This enables the counter object to interact with the object with a smooth motion while causing the agent to emulate or reproduce an exemplary behavior characteristic by controlling the behavior of the agent according to one of the position trajectory candidates.

As a comparative example, a case is discussed where a position trajectory candidate is generated without the nodes of the acceleration $\alpha_2$ and the jerk $\beta_2$ in the DBN (refer to FIG. 13). According to the comparative example, the position trajectory candidate in which the displacement velocity $v_2$ and the acceleration $\alpha_2$ of the racket position $x_2$ are partially discontinuous is generated, as illustrated on the left side in FIGS. 16(a) and 16(b). In this case, when the robot 1 moves the arm 12 or the like according to the position trajectory candidate, an unsmooth motion will result, typically represented by a sudden change in the moving velocity of the arm 12 and the leg 14.

Figure 16:
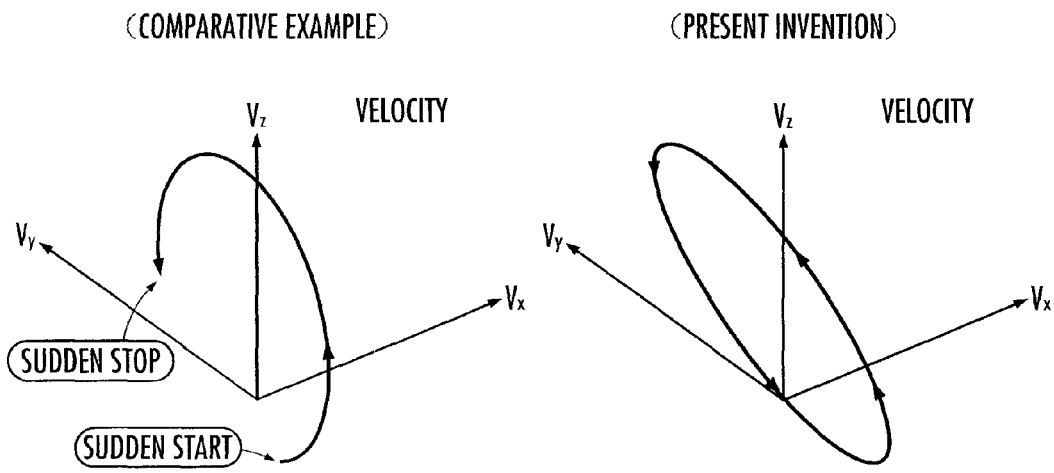
FIG. 16(a) and FIG. 16(b) are comparative graphical illustrations of position trajectory candidates generated by different DBNs.
Figure 16:
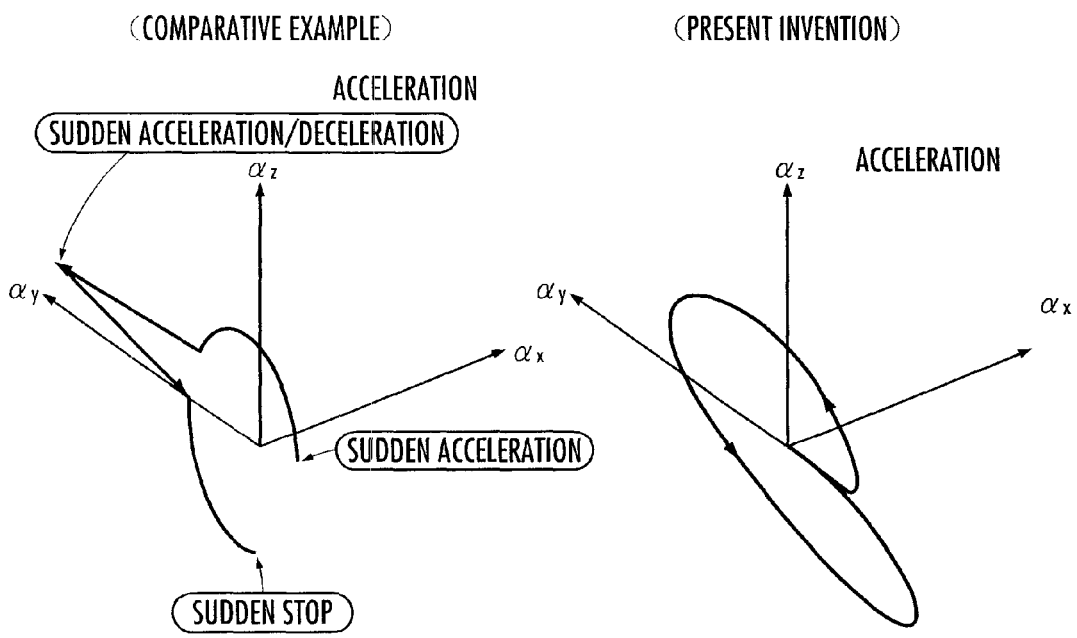

In contrast to the comparative example, the behavior control system according to the present invention generates a position trajectory candidate in which the displacement velocity $v_2$ and the acceleration $\alpha_2$ of the racket position $x_2$ are continuous, as illustrated on the right side in FIGS. 16(a) and 16(b). It is understood, therefore, that the position trajectory candidate enables the robot 1 to smoothly move the arm 12 and the leg 14 or the like to perform the task.

(Other Embodiments of the Present Invention)

Among a plurality of position trajectory candidates of the counter object, the one whose degree of overlapping Ci with a predicted position trajectory of an object (the first embodiment) or the one whose total degree of overlapping Cm (the second embodiment) is the lowest may be selected as the desired position trajectory of the counter object (refer to STEP136 of FIG. 3 and STEP236 of FIG. 7). In this case also, the behavior plan of the agent (the robot 1) is generated such that the counter object is moved according to the desired position trajectory (refer to STEP138 of FIG. 3 and STEP238 of FIG. 7).

Thus, the behavior of the robot 1 is controlled to avoid the contact between the counter object and the object by adjusting the movement of the counter object. Further, the behavior of the robot 1 may be controlled to deliberately prevent the counter object from contacting the object so as to cause the object to be displaced according to a specified position trajectory.

Combining the first embodiment or the second embodiment with the present modification example makes it possible to control the behavior of the robot 1 such that a counter object interacts with some objects of a plurality of objects while avoiding interaction with the remaining objects. For example, it is possible to cause the robot 1 to perform a task of hitting back with a racket one of two balls coming from the front while avoiding contact between the racket and the other ball.

In addition, one position trajectory candidate may be selected as the desired position trajectory of the counter object from among a predetermined number of position trajectory candidates whose degrees of overlapping Ci with a predicted position trajectory of an object or whose total degree of overlapping Cm therewith are upper ranks or lower ranks among a plurality of position trajectory candidates of the counter object. Further, one position trajectory candidate may be selected as the desired position trajectory of the counter object from among position trajectory candidates whose degrees of overlapping Ci with a predicted position trajectory of an object or whose total degree of overlapping Cm therewith are a first reference value or more or a second reference value or less, the second reference value being lower than the first reference value among a plurality of position trajectory candidates of the counter object.

Thus, the behavior of the robot 1 is controlled such that the degree of interaction or separation between the counter object and the object is adjusted by adjusting the movement of the counter object. For instance, the degree of interaction can be adjusted to cause a high degree of interaction typically represented by causing the counter object to hit the object or to cause a low degree of interaction typically represented by causing the counter object to graze the object. Further, the counter object and the object can be set apart from each other with a large interval or set apart from each other with a small interval (to an extent that the wind pressure of the counter object acts on the object).

The behavior of the robot 1 may be controlled to perform a variety of tasks of causing the counter object, which is moved as the robot 1 (agent) moves, to interact with a moving object in addition to the task of hitting a moving ball (object) back with a racket (counter object).

Such tasks include, for example, a task in which the robot 1 grabs a falling object with the hand 13 serving as the counter object, a task in which the robot 1 supports the body of a staggering human being with the hand or hands 13, and a task in which the robot 1 kicks a moving ball with the leg 14 serving as the counter object.

A first model and a stochastic transition model may be defined by a first attractor $R_1$ (a first factor) and a second attractor $R_2$ (a second factor), respectively, the characteristics of which are different, before and after an interaction point candidate in the time-series manner.

The first attractor $R_1$ may be defined to indicate the characteristic of a behavior of swinging a racket hard to hit a ball, while the second attractor $R_2$ may be defined to indicate the characteristic of a behavior of swinging the racket softly. This makes it possible to generate a behavior plan that changes the characteristic before or after the task of moving the racket to interact with the object is performed. To be specific, after causing the agent to perform a task, the agent is allowed to behave in a pattern free from restrictions applied before performing the task.

The exemplary position trajectory of a motion state variable may include not only an exemplary position trajectory of a counter object but also an exemplary position trajectory of other motion state variables, such as the position of a hand, the position or bending angle of an elbow, or the position of a shoulder. The exemplary position trajectory of the position of a hand or the like can be recognized by observing the movement of the hand or the Like of an instructor by a motion capture system (refer to FIGS. 15(a) to 15(c)).

In this case, position trajectory candidates are generated, which include, as the motion state variables of the agent, some or all of the velocity and acceleration of the counter object, and the position of a specified location of an agent related to the movement of the counter object, and the displacement velocity and the displacement acceleration thereof in addition to the position of the counter object. Then, a part of one position trajectory candidate having the highest degree of overlapping with the predicted position trajectory of the object among the position trajectory candidates is determined as the desired position trajectory of the counter object.

This arrangement enables the robot 1 (agent) to perform a task by changing the motion state variables, such as the position of the hand 13, the position and bending angle of the elbow joint mechanism, and the position of the shoulder joint mechanism according to a pattern based on an exemplary motion of the instructor (refer to FIGS. 15(a) to 15(c)) in addition to the changing pattern of the position of the counter object.

What is claimed is:

1. A behavior control system which controls the behavior of an agent according to a behavior plan,
   the behavior control system comprising an electronic control unit, and the electronic control unit comprising:
   a first arithmetic processing element configured to determine a predicted position trajectory of an object expressed by a probability density distribution of time-series predicted positions of the object in the future on the basis of time-series measured positions or estimated positions of the object;
   a second arithmetic processing element configured to generate a position trajectory candidate of a counter object expressed by a probability density distribution which indicates likelihoods corresponding to time-series positions of a counter object which includes a position coinciding, in a spatial and time-series manner, with an interaction point candidate included in the predicted position trajectory of the object in a range reachable by the counter object by a motion of the agent; and
   a third arithmetic processing element configured to generate a behavior plan such that a position trajectory of the counter object coincides with a desired position trajectory of the counter object, which is a mean position trajectory or a central position trajectory of one position trajectory candidate selected from among a plurality of position trajectory candidates of the counter object on the basis of the degree of overlapping of a time-series probability density distribution with the predicted position trajectory of the object.

2. The behavior control system according to claim 1, wherein the third arithmetic processing element is configured to select, from among the plurality of position trajectory candidates of the counter object, the one position trajectory candidate whose degree of overlapping of the time-series probability density distribution with the predicted position trajectory of the object is the highest or the lowest.

3. The behavior control system according to claim 1, wherein the second arithmetic processing element is configured to further determine a post-interaction predicted position trajectory of the object expressed by the probability density distribution of the time-series predicted position of the object in the case where it is assumed that the counter object interacts with the object at the interaction point candidate on the basis of the predicted position trajectory of the object and each of the plurality of position trajectory candidates of the counter object, and
the third arithmetic processing element is configured to select the one position trajectory candidate from among the plurality of position trajectory candidates of the counter object on the basis of the degree of overlapping of the time-series probability density distribution between a post-interaction predicted position trajectory of the object and a specified position trajectory in addition to the degree of overlapping of the time-series probability density distribution with the predicted position trajectory of the object.

4. The behavior control system according to claim 3, wherein the third arithmetic processing element is configured to select, from among the plurality of position trajectory candidates of the counter object, the one position trajectory candidate whose total degree of overlapping of the degree of overlapping of the time-series probability density distribution with the predicted position trajectory of the object and the degree of overlapping of the time-series probability density distribution between the post-interaction predicted position trajectory of the object and the specified position trajectory is the highest or the lowest.

5. The behavior control system according to claim 1, wherein the second arithmetic processing element is configured to generate a position trajectory candidate of the counter object such that the spread of the probability density distribution indicating a likelihood associated with the position of the counter object which agrees with the interaction point candidate in the spatial and time series manner is smaller than the spread of a probability density distribution indicating a likelihood associated with another position.

6. The behavior control system according to claim 1, wherein the third arithmetic processing element is configured to calculate the degree of overlapping, excluding a time point that coincides with the interaction point candidate in the time series manner.

7. The behavior control system according to claim 1, wherein the third arithmetic processing element is configured to add a spread based on a standard deviation of the probability density distribution of the position trajectory candidate of the counter object to each of probability density distribution groups of the position trajectory candidate, and then to calculate the degree of overlapping.

8. The behavior control system according to claim 1, wherein the second arithmetic processing element is configured to generate a position trajectory candidate of the counter object according to a stochastic transition model in which the position of the counter object and a first order to an n-th order temporal differential value (n=1, 2, . . .) thereof continuously change according to a factor which indicates the shape property of an exemplary position trajectory of the position of the counter object.

9. The behavior control system according to claim 8, wherein the second arithmetic processing element is configured to generate an estimated position trajectory in the forward direction represented by the probability density distribution of an estimated position of the counter object in the forward direction time-series-wise according to the stochastic transition model, to generate an estimated position trajectory in the reverse direction represented by the probability density distribution of an estimated position of the counter object in the reverse direction time-series-wise, and then to combine, in the time series manner, the probability density distributions of the estimated position trajectory in the forward direction and the estimated position trajectory in the reverse direction, thereby generating a position trajectory candidate of the counter object expressed by the time-series combination result of the probability density distributions.

10. The behavior control system according to claim 8, wherein the second arithmetic processing element is configured to adopt a first factor defined for effecting the interaction between the counter object and the object as the factor before the interaction point candidate time-series-wise, and to generate a position trajectory candidate of the counter object according to the stochastic transition model in which a second factor, which is different from the first factor, is adopted as the factor after the interaction point candidate time-series-wise.

11. A robot acting as an agent which has an actuator and a behavior control system and which is constructed such that the behavior thereof is controlled by controlling the operation of the actuator by the behavior control system, wherein the behavior control system comprises an electronic control unit, and the electronic control unit comprises:
a first arithmetic processing element configured to determine a predicted position trajectory of an object expressed by a probability density distribution of time-series predicted positions of the object in the future on the basis of time-series measured positions or estimated positions of the object;
a second arithmetic processing element configured to generate a position trajectory candidate of a counter object expressed by a probability density distribution which indicates likelihoods corresponding to time-series positions of a counter object which includes a position coinciding, in a spatial and time-series manner, with an interaction point candidate included in the predicted position trajectory of the object in a range reachable by the counter object by a motion of the agent; and
a third arithmetic processing element configured to generate the behavior plan such that a position trajectory of the counter object coincides with a desired position trajectory of the counter object, which is a mean position trajectory or a central position trajectory of one position trajectory candidate selected from among a plurality of position trajectory candidates of the counter object on the basis of the degree of overlapping of a time-series probability density distribution with the predicted position trajectory of the object.

12. The behavior control system according to claim 1, wherein the third arithmetic processing element is configured to add a spread based on a variance of the probability density distribution of the position trajectory candidate of the counter object to each of probability density distribution groups of the position trajectory candidate, and then to calculate the degree of overlapping.

13. The behavior control system according to claim 1, wherein the third arithmetic processing element is configured to correct a spread of each of the probability density distribution groups of the position trajectory candidate to a spread based on a standard deviation of the probability density distribution of the position trajectory candidate of the counter object, and then to calculate the degree of overlapping.

14. The behavior control system according to claim 1, wherein the third arithmetic processing element is configured to correct a spread of each of the probability density distribution groups of the position trajectory candidate to a spread based on a variance of the probability density distribution of the position trajectory candidate of the counter object, and then to calculate the degree of overlapping.

* * * * *